(12) United States Patent
Miura

(10) Patent No.: US 9,076,470 B2
(45) Date of Patent: Jul. 7, 2015

(54) SUSPENSION SUBSTRATE, SUSPENSION, HEAD SUSPENSION, HARD DISK DRIVE, AND METHOD FOR MANUFACTURING SUSPENSION SUBSTRATE

(71) Applicant: DAI NIPPON PRINTING CO., LTD., Tokyo-To (JP)

(72) Inventor: Yoichi Miura, Kawagoe (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 14/461,679

(22) Filed: Aug. 18, 2014

(65) Prior Publication Data

US 2015/0109704 A1    Apr. 23, 2015

Related U.S. Application Data

(62) Division of application No. 13/332,895, filed on Dec. 21, 2011, now Pat. No. 8,853,548.

(30) Foreign Application Priority Data

Dec. 28, 2010    (JP) ................................. 2010-293921

(51) Int. Cl.
*G11B 5/48* (2006.01)
*G11B 5/84* (2006.01)

(52) U.S. Cl.
CPC ................ *G11B 5/4853* (2013.01); *G11B 5/84* (2013.01)

(58) Field of Classification Search
CPC ...... G11B 5/486; G11B 5/484; H05K 1/0245; H05K 1/056
USPC ................................ 360/245.9; 174/254, 260
See application file for complete search history.

(56) References Cited

U.S. PATENT DOCUMENTS 5,717,547 A     2/1998  Young
6,351,351 B1 *  2/2002  Takasugi ................... 360/245.9
(Continued)

FOREIGN PATENT DOCUMENTS

JP    10-124837 A1    5/1998
JP    2008-027570 A1  7/2008
(Continued)

OTHER PUBLICATIONS

Japanese Office Action (Application No. 2010-293921) dated Jun. 27, 2012 (with English translation).
(Continued)

*Primary Examiner* — Angel Castro
(74) *Attorney, Agent, or Firm* — Burr & Brown, PLLC

(57) ABSTRACT

A suspension substrate of the present invention includes an insulating layer, a spring material layer, and a plurality of wirings, wherein one wiring of the plurality of wirings includes a head-side wiring part and a plurality of division wiring parts, respectively bifurcated from the head-side wiring part. The spring material layer includes a spring-material-layer main body, a first spring-material-layer separated body and a second spring-material-layer separated body. The division wiring parts of the one wiring are respectively connected with the first spring-material-layer separated body, via a pair of conductive connection parts, respectively extending through the insulating layer. The first spring-material-layer separated body is located on one side relative to the longitudinal axis, while the second spring-material-layer separated body is located on the other side relative to the longitudinal axis.

10 Claims, 14 Drawing Sheets

(56) References Cited

U.S. PATENT DOCUMENTS

| | | | |
|---|---|---|---|
| 7,595,963 B1* | 9/2009 | Chen et al. | 360/245.9 |
| 7,923,644 B2 | 4/2011 | Ishii et al. | |
| 8,138,427 B2 | 3/2012 | Ishii et al. | |
| 8,853,548 B2* | 10/2014 | Miura | 174/254 |
| 2008/0247131 A1 | 10/2008 | Hitomi et al. | |
| 2009/0101399 A1 | 4/2009 | Iguchi et al. | |
| 2009/0190263 A1* | 7/2009 | Miura et al. | 360/245.8 |
| 2010/0110590 A1 | 5/2010 | Ohsawa et al. | |
| 2012/0090878 A1 | 4/2012 | Hitomi et al. | |
| 2012/0134056 A1* | 5/2012 | Yamada | 360/245.9 |

FOREIGN PATENT DOCUMENTS

| | | |
|---|---|---|
| JP | 2008-287857 A1 | 11/2008 |
| JP | 2009-104712 A1 | 5/2009 |
| JP | 2010-097659 A1 | 4/2010 |
| JP | 2010-108576 A1 | 5/2010 |

OTHER PUBLICATIONS

Japanese Office Action (Application No. 2012-175259) dated Jul. 9, 2013 (with English translation).

* cited by examiner

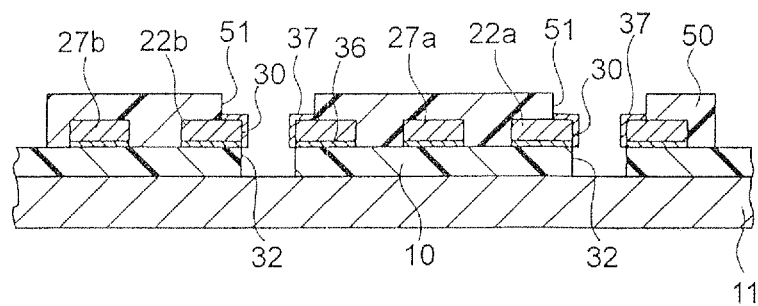
Fig. 10(a)
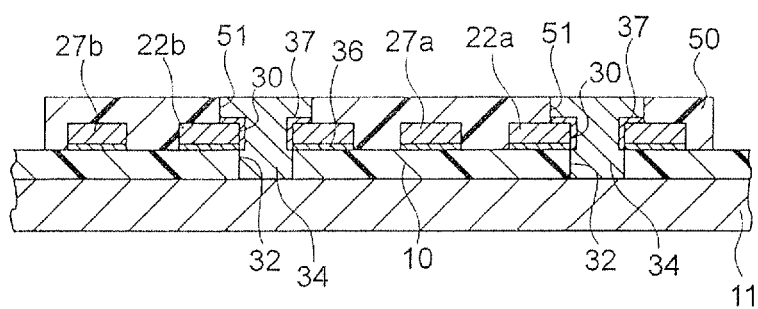
Fig. 10(b)
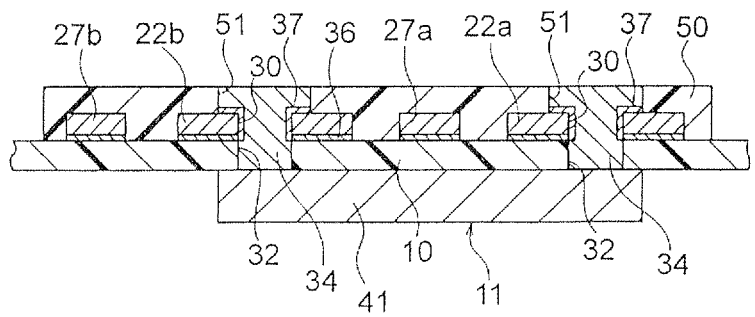
Fig. 10(c)
FIG. 10

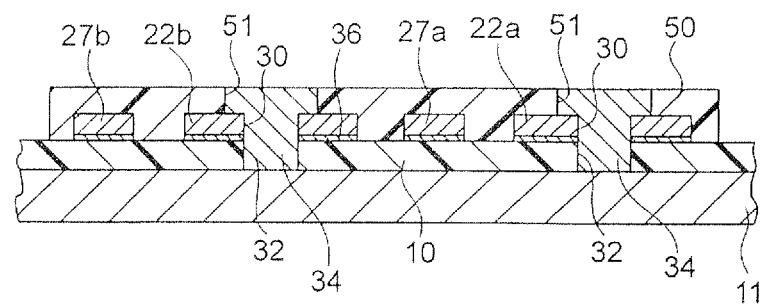
Fig. 11(a)
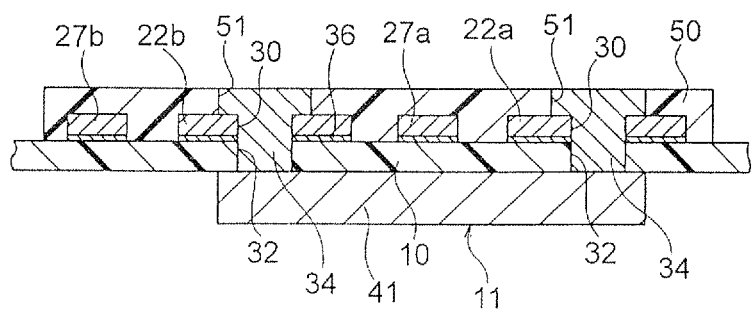
Fig. 11(b)
FIG. 11

Fig. 12(a)
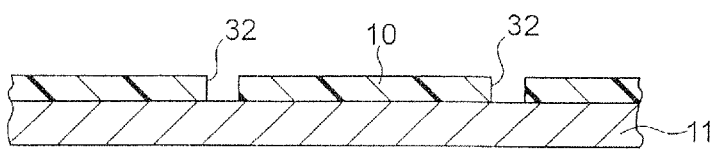
Fig. 12(b)
Fig. 12(c)
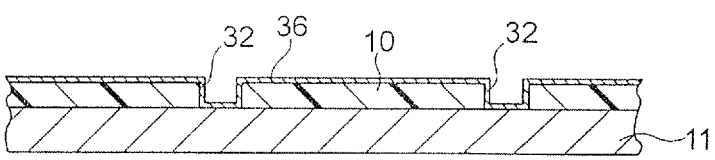
Fig. 12(d)
Fig. 12(e)
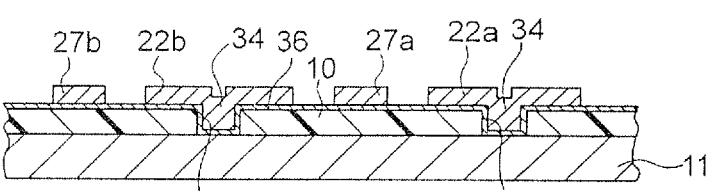
Fig. 12(f)
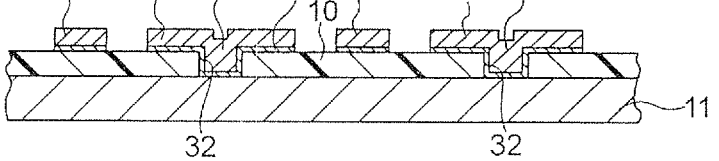
Fig. 12(g)
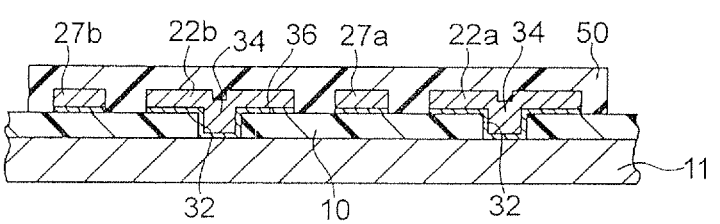
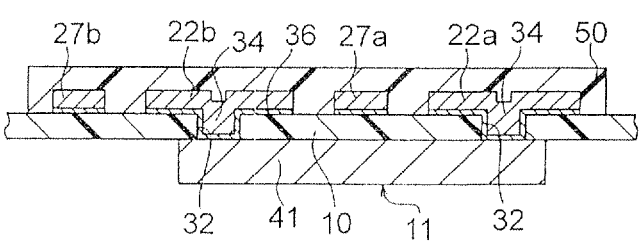
FIG. 12

SUSPENSION SUBSTRATE, SUSPENSION, HEAD SUSPENSION, HARD DISK DRIVE, AND METHOD FOR MANUFACTURING SUSPENSION SUBSTRATE

CROSS REFERENCE TO RELATED APPLICATIONS

This application is a division of U.S. patent application Ser. No. 13/332,895 filed Dec. 21, 2011 and claims the benefit of Japanese Patent Application No. 2010-293921 filed Dec. 28, 2010, the entireties of which are incorporated herein by reference.

FIELD OF THE INVENTION

The present invention relates to a suspension substrate, a suspension, a head suspension, a hard disk drive and a method for manufacturing the suspension substrate. In particular, this invention relates to the suspension substrate, suspension, head suspension, hard disk drive and method for manufacturing the suspension substrate, respectively adapted for enhancing electric characteristics and stabilizing floating properties of a slider.

BACKGROUND OF THE INVENTION

Generally, the hard disk drive (HDD) includes the suspension on which a magnetic head slider is mounted. In this case, the magnetic head slider is provided for writing and reading data relative to a disk adapted for storing data therein. The suspension includes the suspension substrate having a spring metallic layer and a plurality of (e.g., four to six) wirings, respectively layered on the spring metallic layer, via an insulating layer. With this configuration, by flowing or sending an electric signal through each wiring, the writing and reading of the data relative to the disk can be performed.

In recent years, it has been demanded to provide a more high-speed transmission line and increase the speed and amount of data processing. To this end, it is necessary to enhance the electric characteristics, such as impedance or the like, of the substrate.

In order to enhance such electric characteristics, one suspension substrate has been proposed, which includes a pair of wirings, each bifurcated into two wiring parts, via a bridge circuit, with the wiring parts bifurcated from one wiring being respectively arranged alternately to the wiring parts bifurcated from the other wiring (e.g., see JP 10-124837A).

SUMMARY OF THE INVENTION

The bridge circuit provided for one wiring, as disclosed in the above JP 10-124837A, is arranged to extend across the other wiring. Therefore, such a bridge circuit should have a multi-layered structure including the wirings respectively layered one on another. Accordingly, such a multi-layered structure may tend to make the entire structure of the suspension substrate be rather complicated, thus leading to a considerably complicated manufacturing process.

To address this problem, one approach utilizing the spring metallic layer for constituting the bridge circuit has been proposed. In this approach, the bridge circuit is constituted by dividing one spring metallic layer into a main part and an island part that is isolated and separated from the main part, wherein the so-separated island part is used as a lower-layer wiring.

By the way, in order to increase the speed of writing the data relative to the disk, there has been a strong demand for effectively reducing the impedance of a pair of writing wirings, among the plurality of wirings. For instance, in order to enhance the performance of the hard disk, it is necessary to provide the pair of writing wirings, respectively bifurcated into the wiring parts and arranged alternately relative to one another, as described above.

However, in general, such a pair of writing wirings is located together on one side relative to a longitudinal axis passing through the center of the slider. In addition, the separated island part used as the lower-layer wiring of writing wiring is located on the one side relative to the longitudinal axis. Therefore, the separated island part of the spring metallic layer may tend to be disposed on one side relative to the longitudinal axis, leading to substantial deterioration of the stability of the floating properties of the slider.

The present invention was made in light of the above problems. Therefore, it is an object of this invention to provide the suspension substrate, suspension, head suspension, hard disk drive and method for manufacturing the suspension substrate, respectively capable of enhancing the electric characteristics and stabilizing the floating properties of the slider.

In a first aspect of the present invention, the suspension substrate, extending from a head portion on which the slider is mounted, to a tail portion with which an external connection substrate is connected, the suspension substrate having the linear longitudinal axis passing through the center of the slider to be mounted on the head portion, is provided to include: the insulating layer; a spring material layer provided on one face of the insulating layer, the spring material layer having conductivity; and the plurality of wirings, respectively provided on the other face of the insulating layer, wherein one wiring of the plurality of wirings includes a head-side wiring part extending from the head portion and a plurality of division wiring parts, respectively bifurcated from the head-side wiring part, wherein the spring material layer includes a spring-material-layer main body, and a first spring-material-layer separated body and a second spring-material-layer separated body, respectively separated from the spring-material-layer main body as well as separated from each other, wherein a pair of conductive connection parts are provided to extend through the insulating layer, wherein one division wiring part of said one wiring is connected with the first spring-material-layer separated body, via one of the conductive connection parts, while the other division wiring parts are respectively connected with the first spring-material-layer separated body, via the other conductive connection part, and wherein the first spring-material-layer separated body is located on one side relative to the longitudinal axis, while the second spring-material-layer separated body is located on the other side relative to the longitudinal axis.

In the above first aspect of the present invention, it is preferred that the first spring-material-layer separated body and second spring-material-layer separated body are respectively arranged to have line symmetry, relative to each other, about the longitudinal axis.

Further, in the first aspect of this invention, it is preferred that the first spring-material-layer separated body and second spring-material-layer separated body are respectively located on the distal end side relative to the slider to be mounted on the head portion.

Further, in the first aspect of this invention, it is preferred that a distal-end portion of the first spring-material-layer separated body located on the opposite side relative to the longitudinal axis and a distal-end portion of the second spring-material-layer separated body located on the opposite side relative to the longitudinal axis are not respectively surrounded by the spring-material-layer main body.

Further, in the first aspect of this invention, it is preferred that the spring-material-layer main body includes a tongue part for supporting the slider to be mounted on the head portion, and a pair of outrigger parts, respectively provided to be separated from each other on either side of the tongue part, the outrigger parts extending along the longitudinal axis, wherein each wiring is arranged between the tongue part and each outrigger part, and wherein the first spring-material-layer separated body and second spring-material-layer separated body are respectively located on the distal end side relative to each corresponding outrigger part.

Further, in the first aspect of this invention, it is preferred that the spring-material-layer main body includes the tongue part for supporting the slider to be mounted on the head portion, and the pair of outrigger parts, respectively provided to be separated from each other on either side of the tongue part, the outrigger parts extending along the longitudinal axis, wherein each wiring and the first spring-material-layer separated body and second spring-material-layer separated body are respectively arranged on the opposite side relative to the longitudinal axis, across each corresponding outrigger part.

Further, in the first aspect of this invention, it is preferred that each of the first spring-material-layer separated body and second spring-material-layer separated body is formed into a rectangular shape extending along the longitudinal axis, wherein each distal-end-side corner portion, of the first spring-material-layer separated body and second spring-material-layer separated body, located on the opposite side relative to the longitudinal axis, is chamfered.

Further, in the first aspect of this invention, it is preferred that the first spring-material-layer separated body and the second spring-material-layer separated body have the same planar shape.

Further, in the first aspect of this invention, it is preferred that the first spring-material-layer separated body and the second spring-material-layer separated body have the same mass.

Further, in a second aspect of the present invention, the suspension substrate, extending from the head portion on which the slider is mounted, to the tail portion with which the external connection substrate is connected, the suspension substrate having the linear longitudinal axis passing through the center of the slider to be mounted on the head portion, is provided to include: the insulating layer; the spring material layer provided on one face of the insulating layer, the spring material layer having the conductivity; and the plurality of wirings, respectively provided on the other face of the insulating layer, wherein one wiring of the plurality of wirings includes the head-side wiring part extending from the head portion and the plurality of division wiring parts, respectively bifurcated from the head-side wiring part, wherein the spring material layer includes the spring-material-layer main body and one spring-material-layer separated body separated from the spring-material-layer main body, wherein the pair of conductive connection parts are provided to extend through the insulating layer, wherein one division wiring part of said one wiring is connected with the spring-material-layer separated body, via one of the conductive connection parts, while the other division wiring parts are respectively connected with the spring-material-layer separated body, via the other conductive connection part, and wherein the spring-material-layer separated body is located on the longitudinal axis.

In the above second aspect of the present invention, it is preferred that the spring-material-layer separated body is located on the distal end side relative to the slider to be mounted on the head portion.

Further, in the second aspect of this invention, it is preferred that the spring-material-layer separated body is surrounded by the spring-material-layer main body.

In the above first and second aspects of the present invention, it is preferred that the thickness of the spring material layer is greater than the thickness of each wiring.

Further, in the above first and second aspects of this invention, it is preferred that said one wiring and another or second wiring constitute together a pair of writing wirings, wherein the second wiring includes another or second head-side wiring part extending from the head portion and a plurality of another or second division wiring parts, respectively bifurcated from the second head-side wiring part, and wherein the division wiring parts of said one wiring and the second division wiring parts of the second wiring are respectively arranged alternately to one another.

Further, in the above first and second aspects of this invention, it is preferred that one wiring of the plurality of wirings is provided as a grounding wiring for grounding the slider to be mounted on the head portion, wherein a pair of grounding connection parts are provided to extend through the insulating layer, wherein the grounding wiring is connected with the spring-material-layer main body, via each grounding connection part, and wherein one grounding connection part is located on one side relative to the longitudinal axis, and the other grounding connection part is located on the other side relative to the longitudinal axis, while having the line symmetry, relative to the one grounding connection part, about the longitudinal axis.

In a third aspect of the present invention, the suspension substrate, extending from the head portion on which the slider is mounted, to the tail portion with which the external connection substrate is connected, the suspension substrate having the linear longitudinal axis passing through the center of the slider to be mounted on the head portion, is provided to include: the insulating layer; the spring material layer provided on one face of the insulating layer, the spring material layer having the conductivity; and the plurality of wirings, respectively provided on the other face of the insulating layer, wherein one wiring of the plurality of wirings is provided as the grounding wiring for grounding the slider to be mounted on the head portion, wherein the pair of grounding connection parts are provided to extend through the insulating layer, wherein the grounding wiring is connected with the spring material layer, via each grounding connection part, and wherein one grounding connection part is located on one side relative to the longitudinal axis, and the other grounding connection part is located on the other side relative to the longitudinal axis.

In the above third aspect of the present invention, it is preferred that the pair of grounding connection parts are respectively arranged to have the line symmetry, relative to each other, about the longitudinal axis.

The present invention provides the suspension including any one of the above suspension substrates respectively related to this invention.

The present invention provides the head suspension including the above suspension related to this invention and the slider mounted on the suspension.

The present invention provides the hard disk drive including the above head suspension related to this invention.

In a fourth aspect of the present invention, the method, for manufacturing the suspension substrate extending from the head portion on which the slider is mounted, to the tail portion with which the external connection substrate is connected, the suspension substrate having the linear longitudinal axis passing through the center of the slider to be mounted on the head portion, is provided to include: preparing a layered material or body including the insulating layer, the spring material layer provided on one face of the insulating layer, the spring material layer having the conductivity, and a wiring material layer provided on the other face of the insulating layer; forming the plurality of wirings from the wiring material layer, such that one wiring of the plurality of wirings includes the head-side wiring part extending from the head portion and the plurality of division wiring parts, respectively bifurcated from the head-side wiring part, as well as forming a pair of wiring through-holes for each division wiring part; forming a pair of insulating through-holes in the insulating layer, in positions respectively corresponding to the pair of wiring through-holes; forming the conductive connection part in each wiring through-hole and each insulating through-hole; and forming the spring-material-layer main body, and the first spring-material-layer separated body and second spring-material-layer separated body, respectively separated from the spring-material-layer main body as well as separated from each other, from the spring material layer, wherein one division wiring part of said one wiring is connected with the first spring-material-layer separated body, via one conductive connection part, while the other division wiring parts are respectively connected with the first spring-material-layer separated body, via the other conductive connection part, and wherein the first spring-material-layer separated body is located on one side relative to the longitudinal axis, while the second spring-material-layer separated body is located on the other side relative to the longitudinal axis.

In a fifth aspect of the present invention, the method, for manufacturing the suspension substrate extending from the head portion on which the slider is mounted, to the tail portion with which the external connection substrate is connected, the suspension substrate having the linear longitudinal axis passing through the center of the slider to be mounted on the head portion, is provided to include: preparing the spring material layer; forming the insulating layer having the pair of insulating through-holes, in the spring material layer; forming the plurality of wirings on the insulating layer, such that one wiring of the plurality of wirings includes the head-side wiring part extending from the head portion and the plurality of division wiring parts, respectively bifurcated from the head-side wiring part, as well as forming the conductive connection part in each insulating through-hole; and forming the spring-material-layer main body, and the first spring-material-layer separated body and second spring-material-layer separated body, respectively separated from the spring-material-layer main body as well as separated from each other, from the spring material layer, wherein one division wiring part of said one wiring is connected with the first spring-material-layer separated body, via one conductive connection part, while the other division wiring parts are respectively connected with the first spring-material-layer separated body, via the other conductive connection part, and wherein the first spring-material-layer separated body is located on one side relative to the longitudinal axis, while the second spring-material-layer separated body is located on the other side relative to the longitudinal axis.

In the above fourth and fifth aspects of the present invention, it is preferred that the first spring-material-layer separated body and second spring-material-layer separated body are respectively arranged to have the line symmetry, relative to each other, about the longitudinal axis.

In a sixth aspect of the present invention, the method, for manufacturing the suspension substrate extending from the head portion on which the slider is mounted, to the tail portion with which the external connection substrate is connected, the suspension substrate having the linear longitudinal axis passing through the center of the slider to be mounted on the head portion, is provided to include: preparing the layered body including the insulating layer, the spring material layer provided on one face of the insulating layer, the spring material layer having the conductivity, and the wiring material layer provided on the other face of the insulating layer; forming the plurality of wirings from the wiring material layer, such that one wiring of the plurality of wirings includes the head-side wiring part extending from the head portion and the plurality of division wiring parts, respectively bifurcated from the head-side wiring part, as well as forming the pair of wiring through-holes for each division wiring part; forming the pair of insulating through-holes in the insulating layer, in positions respectively corresponding to the pair of wiring through-holes; forming the conductive connection part in each wiring through-hole and each insulating through-hole; and forming the spring-material-layer main body and spring-material-layer separated body separated from the spring-material-layer main body, from the spring material layer, wherein one division wiring part of said one wiring is connected with the spring-material-layer separated body, via one conductive connection part, while the other division wiring parts are respectively connected with the spring-material-layer separated body, via the other conductive connection part, and wherein the spring-material-layer separated body is located on the longitudinal axis.

In a seventh aspect of the present invention, the method, for manufacturing the suspension substrate extending from the head portion on which the slider is mounted, to the tail portion with which the external connection substrate is connected, the suspension substrate having the linear longitudinal axis passing through the center of the slider to be mounted on the head portion, is provided to include: preparing the spring material layer; forming the insulating layer having the pair of insulating through-holes, in the spring material layer; forming the plurality of wirings on the insulating layer, such that one wiring of the plurality of wirings includes the head-side wiring part extending from the head portion and the plurality of division wiring parts, respectively bifurcated from the head-side wiring part, as well as forming the conductive connection part in each insulating through-hole; and forming the spring-material-layer main body and spring-material-layer separated body separated from the spring-material-layer main body, from the spring material layer, wherein one division wiring part of said one wiring is connected with the spring-material-layer separated body, via one conductive connection part, while the other division wiring parts are respectively connected with the spring-material-layer separated body, via the other conductive connection part, and wherein the spring-material-layer separated body is located on the longitudinal axis.

According to each of the above first, second, and fourth to seventh aspects of the present invention, one wiring of the plurality of wirings can be appropriately bifurcated, and the shape of the spring material layer can be well balanced on either side of the longitudinal axis. Thus, the balance of air bearing or resistance and the balance of mass in the suspension substrate can be substantially enhanced. Therefore, the electric characteristics can be adequately enhanced, as well as the floating properties of the slider mounted on the suspension substrate can be effectively stabilized.

Further, according to the above third aspect of the present invention, the grounding wiring for grounding the slider mounted on the suspension substrate is connected with the spring material layer, via the pair of grounding connection parts which are located on both sides of the longitudinal axis. Thus, the flexibility of the suspension substrate can be controlled to have adequate line symmetry about the longitudinal axis. As such, the balance of air bearing or resistance and the balance of mass in the suspension substrate can be substantially enhanced, thereby positively stabilizing the floating properties of the slider.

Consequently, according to the present invention, the electric properties can be substantially enhanced, as well as the floating properties of the slider can be significantly stabilized.

BRIEF DESCRIPTION OF THE DRAWINGS

FIGS. 10(a) to 10(c) are diagrams respectively provided for further illustrating the method for manufacturing the suspension substrate related to the first embodiment of the present invention.

FIGS. 11(a), 11(b) are diagrams respectively provided for illustrating one variation of the method for manufacturing the suspension substrate related to the first embodiment of the present invention.

FIGS. 12(a) to 12(g) are diagrams respectively provided for illustrating another variation of the method for manufacturing the suspension substrate related to the first embodiment of the present invention.

DETAILED DESCRIPTION OF THE INVENTION

First Embodiment

Now referring to FIGS. 1 through 10, the suspension substrate, suspension, head suspension, hard disk drive and method for manufacturing the suspension substrate, respectively related to the first embodiment of the present invention, will be described.

Figure 1:
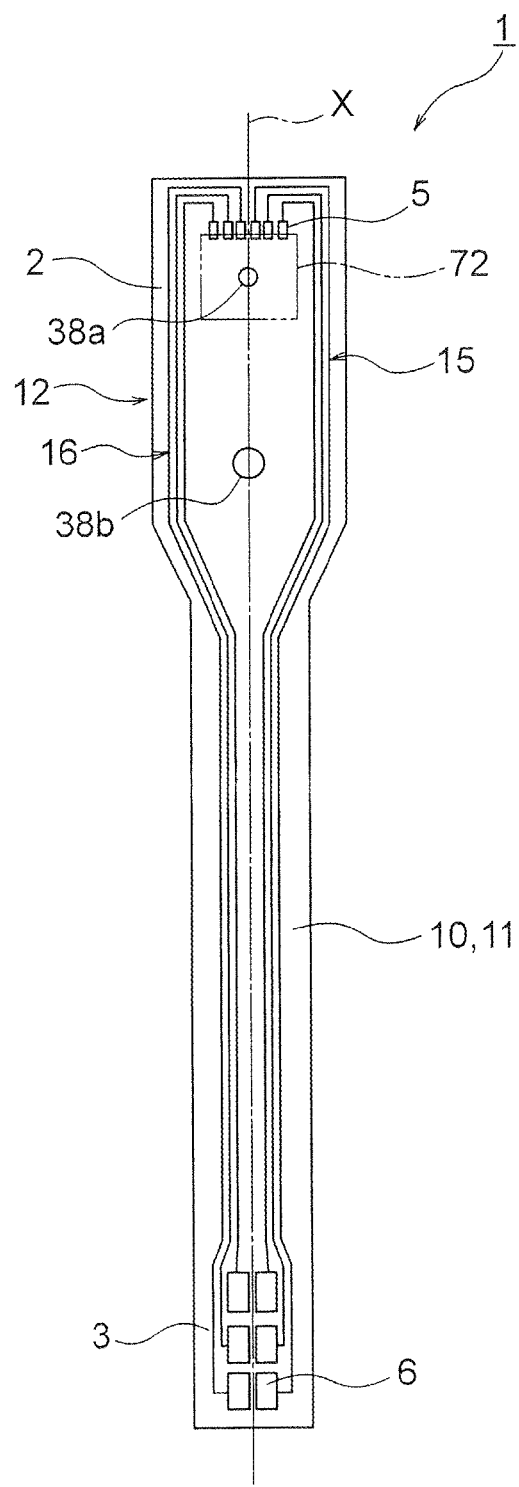
FIG. 1 is a plan view showing one example of the suspension substrate related to a first embodiment of the present invention.

As shown in FIG. 1, the suspension substrate 1 has an elongated shape, and includes the head portion 2 and tail portion 3. In this case, the slider 72 (see FIG. 7) is mounted on the head portion 2, and the external connection substrate 101 is connected with the tail portion 3 (see FIG. 7). The longitudinal axis X of the suspension substrate 1 is arranged to pass through the center of the slider 72 that will be mounted on the suspension substrate 1. A plurality of head terminals 5 that will be respectively connected with the slider 72 are provided to the head portion 2, and a plurality of external-equipment connection terminals 6 that will be respectively connected with the external connection substrate 101 are provided to the tail portion 3. Further, in this case, the head terminals 5 are connected with the external-equipment connection terminals 6, respectively, via the plurality of wirings 12 that will be described later.

Figure 2:
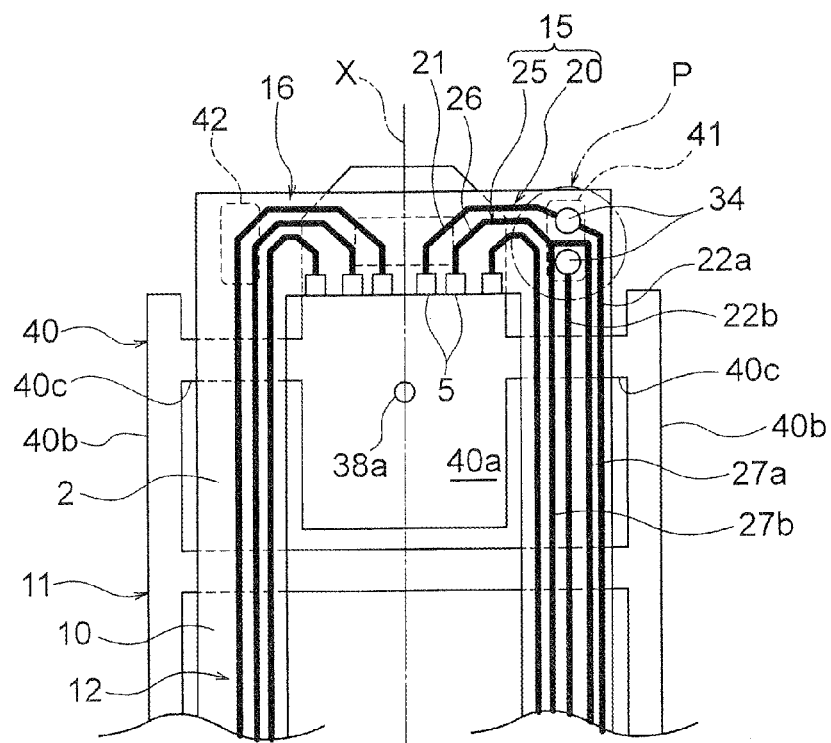
FIG. 2 is an enlarged plan view showing the head portion of the suspension substrate related to the first embodiment of the present invention.
Figure 5:
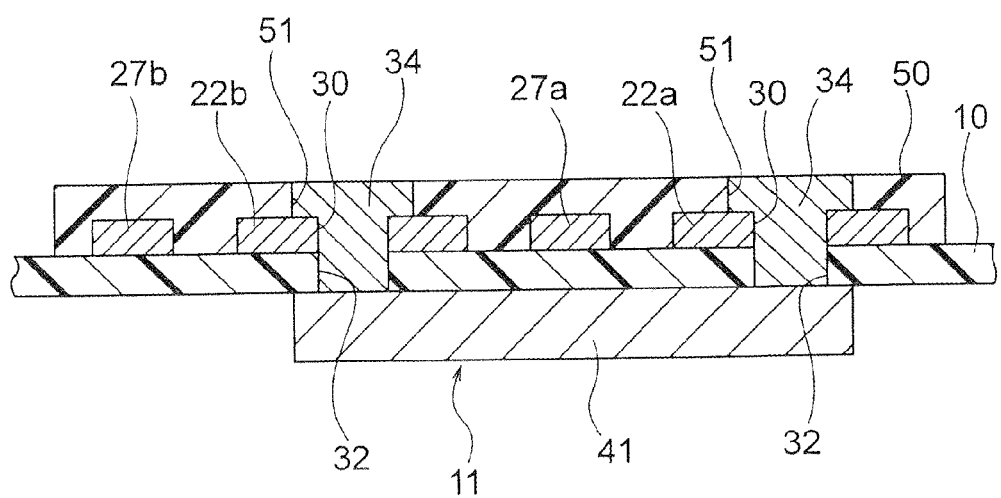
FIG. 5 is a cross section taken along line A-A shown in FIG. 4.

As shown in FIGS. 1, 2 and 5, the suspension substrate 1 includes the insulating layer 10, the spring material layer (or metallic support layer) 11 provided on one face of the insulating layer 10 and having the conductivity, and the plurality of (e.g., six) wirings 12, respectively provided on the other face of the insulating layer 10. Two of the six wirings 12 constitute together a pair of writing wirings 15 (i.e., a first writing wiring 20 and a second writing wiring 25), respectively arranged to be adjacent to each other. Other two of the six wirings 12 constitute together a pair of reading wirings 16, respectively arranged to be adjacent to each other.

Figure 4:
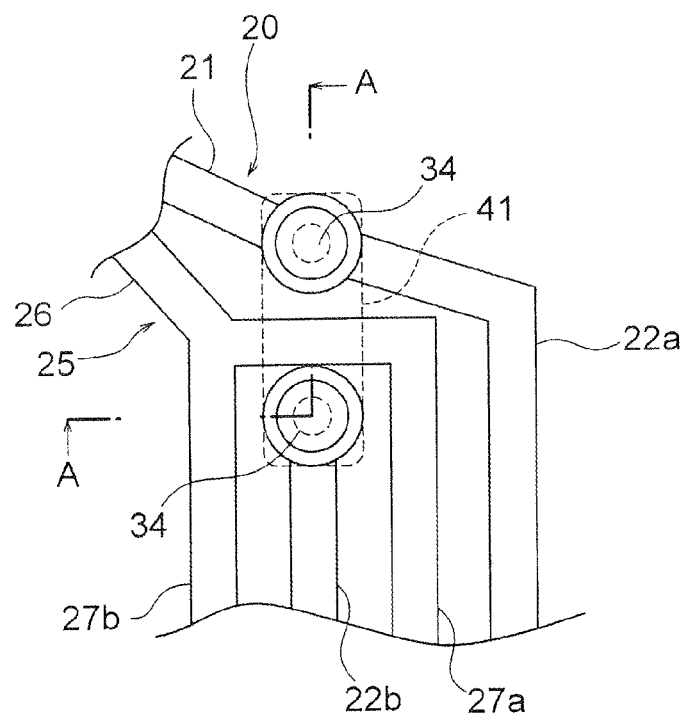
FIG. 4 is a diagram provided for illustrating details of a portion P shown in FIG. 2.

As shown in FIGS. 2, 4 and 5, the first writing wiring (or one wiring) 20 includes a first head-side wiring part 21 extending from the head portion 2 and a plurality of (e.g., two) first division wiring parts 22a, 22b respectively bifurcated from the first head-side wiring part 21. On the face of the insulating layer 10 on the side of the wirings 12, the first head-side wiring part 21 is connected with a head-side end of the first division wiring part 22a. Further, to the head-side end of each first division wiring part 22a, 22b, a head-side wiring through-hole 30 is provided for constituting the conductive connection part 34 that will be described later (see FIG. 5). The first writing wiring 20 further includes a first tail-side wiring part (not shown) extending toward the tail portion 3. Similar to the second head-side wiring part 26 and second division wiring parts 27a, 27b (that will be respectively described later), the first division wiring parts 22a, 22b are respectively connected with the first tail-side wiring part, on the face of the insulating layer 10 on the side of the wirings 12.

The second writing wiring (or second wiring) 25 includes the second head-side wiring part 26 extending from the head portion 2 and the two second division wiring parts 27a, 27b respectively bifurcated from the second head-side wiring part 26. Each second division wiring part 27a, 27b is connected with the second head-side wiring part 26, on the face of the insulating layer 10 on the side of the wirings 12. The second writing wiring 25 further includes a second tail-side wiring part (not shown) extending toward the tail portion 3. The second division wiring parts 27a, 27b are respectively connected with the second-tail side wiring part, while being bifurcated therefrom. In this case, the connection structure between the second tail-side wiring part and each second division wiring part 27a, 27b is similar to the structure of a head-side bifurcated portion, in which the first head-side wiring part 21 is connected with each first division wiring part 22a, 22b.

Further, in this case, the first division wiring parts 22a, 22b of the first writing wiring 20 and the second division wiring parts 27a, 27b of the second writing wiring 25 are respectively arranged alternately to one another. More specifically, one second division wiring part 27a is arranged between the two first division wiring parts 22a, 22b, while one first division wiring part 22b is arranged between the two second division wiring parts 27a, 27b. For clarity, in FIG. 1, the first writing wiring 20 and second writing wiring 25 are not illustrated, in detail, respectively.

As shown in FIG. 5, a pair of head-side insulating through-holes 32 is provided to extend through the insulating layer 10. Each head-side insulating through-hole 32 is located in a position corresponding to the head-side bifurcated portion of the first writing wiring 20 (i.e., a position corresponding to the head-side wiring through-hole 30).

For each head-side wiring through-hole 30 and each head-side insulating through-hole 32 are provided with the conductive connection part 34 extending through the insulating layer 10.

Figure 3:
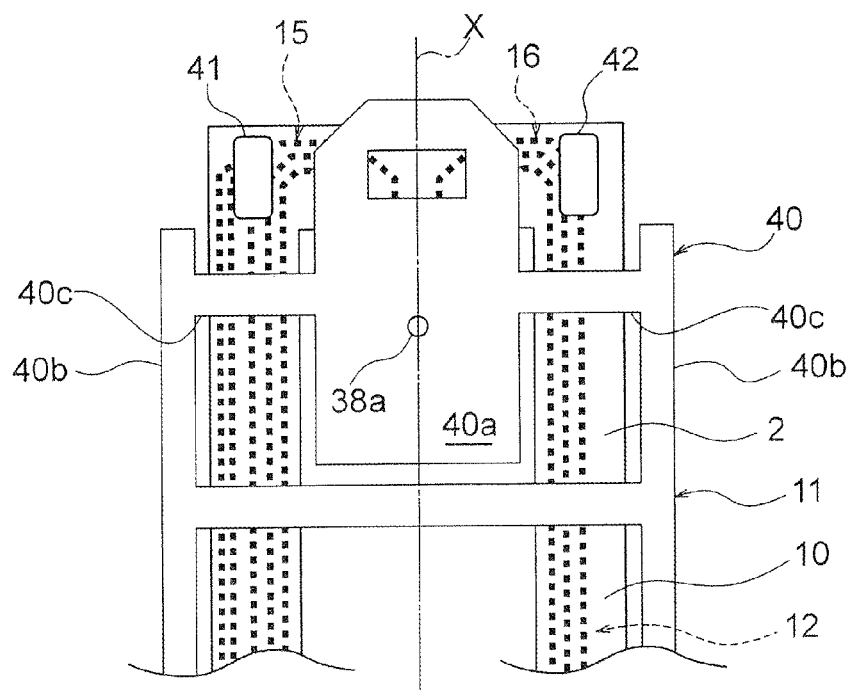
FIG. 3 is a back view of FIG. 1.

As shown in FIGS. 2 and 3, the spring material layer 11 includes the spring-material-layer main body 40, first spring-material-layer separated body 41 and second spring-material-layer separated body 42. The first and second spring-material-layer separated bodies 41, 42 are respectively separated from the spring-material-layer main body 40 as well as separated from each other. Each of the first and second spring-material-layer separated bodies 41, 42 has a rectangular shape extending along the longitudinal axis X. In this case, the first spring-material-layer separated body 41 is located on one side relative to the longitudinal axis X, while the second spring-material-layer separated body 42 is located on the other side relative to the longitudinal axis X, wherein such two separated bodies 41, 42 are arranged to have the line symmetry, relative to each other, about the longitudinal axis X. Further, the first spring-material-layer separated body 41 is located in a position corresponding to the head-side bifurcated portion of the first writing wiring 20. It is noted that the term "line symmetry" as used herein may not refer to precise line symmetry. In other words, the term "line symmetry" used herein may include some positional errors or shifts, in the line-symmetry relationship between the two separated bodies 41, 42 about the longitudinal axis X, attributable to the flexibility of the head portion 2 in the suspension substrate 1. In addition, as shown in FIGS. 2 and 3, it is preferred that the first spring-material-layer separated body 41 and the second spring-material-layer separated body 42 have the same planar shape. In other words, it is preferred that the first spring-material-layer separated body 41 and the second spring-material-layer separated body 42 have the same mass. In this case, as described later, the balance of mass in the suspension substrate 1 can be substantially enhanced, thereby adequately stabilizing the floating properties of the slider 72. It is noted that the term "same" as used herein may not refer to precise same. In other words, the term "same" used herein may include some manufacturing errors in the extent that can be considered to be the same.

Further, as shown in FIGS. 2 and 4, one first division wiring part 22a of the first writing wiring 20 is connected with the first spring-material-layer separated body 41, via one conductive connection part 34, while the other first division wiring part 22b of the first writing wiring 20 is connected with the first spring-material-layer separated body 41, via the other conductive connection part 34. In this manner, the first spring-material-layer separated body 41 is electrically connected with each first division wiring part 22a, 22b. Meanwhile, the second spring-material-layer separated body 42 is not connected with any one of the wirings 12.

Further, as shown in FIGS. 2 and 3, the first spring-material-layer separated body 41 and second spring-material-layer separated body 42 are respectively located on the distal end side (i.e., on the side opposite to the tail portion 3 or on the upper side in FIGS. 1 through 3) of the suspension substrate 1, relative to the slider 72 that will be mounted on the suspension substrate 1. More specifically, the head-side bifurcated portion of the first writing wiring 20 is located on the distal end side of the suspension substrate 1 relative to the slider 72, while being adjacent to the slider 72. Similarly, the head-side bifurcated portion of the second writing wiring 25 is located on the distal end side of the suspension substrate 1 relative to the slider 72, while being adjacent to the slider 72. Although not shown, it is preferred that each tail-side bifurcated portion of the first writing wiring 20 and second writing wiring 25 is located near the external-equipment connection terminals 6. With this configuration, the region, in which the first division wiring parts 22a, 22b and second division wiring parts 27a, 27b are respectively arranged alternately to one another, can be provided to be adequately long, thereby substantially reducing the impedance of the pair of writing wirings 15.

The spring-material-layer main body 40 includes a tongue part 40a provided for supporting the slider 72 that will be mounted on the suspension substrate 1, and a pair of outrigger parts 40b respectively provided on either side of the tongue part 40a. The outrigger parts 40b are respectively separated from the tongue part 40a and respectively extend along the longitudinal axis X. The tongue part 40a is connected with the outrigger parts 40b via each corresponding connection member 40c. Each wiring 12 is arranged between the tongue part 40a and each corresponding outrigger part 40b. Namely, as shown in FIG. 2, the pair of writing wirings 15 are arranged between one outrigger part 40b (located on the right side in FIG. 2) and the longitudinal axis X, while the pair of reading wirings 16 are arranged between the other outrigger part 40b (located on the left side in FIG. 2) and the longitudinal axis X, in the so-called inner-trace arrangement manner.

Further, each of the first-spring-material-layer separated body 41 and second spring-material-layer separated body 42 is located on the distal end side relative to the corresponding outrigger part 40b. More specifically, the distal-end portion of the first spring-material-layer separated body 41 located on the opposite side (or on the right side in FIG. 2) relative to the longitudinal axis X is not surrounded by the spring-material-layer main body 40. Similarly, the distal-end portion of the second spring-material-layer separated body 42 located on the opposite side (or on the left side in FIG. 2) relative to the longitudinal axis X is not surrounded by the spring-material-layer main body 40.

Further, as shown in FIG. 1, two jig holes 38a and 38b are provided, respectively, in the insulating layer 10 and spring-material-layer main body 40. Such jig holes 38a and 38b are respectively utilized for alignment between a load beam 62 for holding the spring material layer 11 and the suspension substrate 1, when the load beam 62 is mounted on the suspension substrate 1. In this case, the jig holes 38a and 38b are respectively arranged on the longitudinal axis X. In other words, the longitudinal axis X passes through the respective jig holes 38a and 38b.

Further, as shown in FIG. 5, a protective layer 50 for covering the wirings 12 is provided on the insulating layer 10. The protective layer 50 includes openings 51 for exposing each conductive connection part 34 to the outside. Thus, the top face of each conductive connection part 34 can be exposed to the outside. It is noted that the protective layer 50 is not shown in FIGS. 1 through 4, for clarity.

Figure 9:
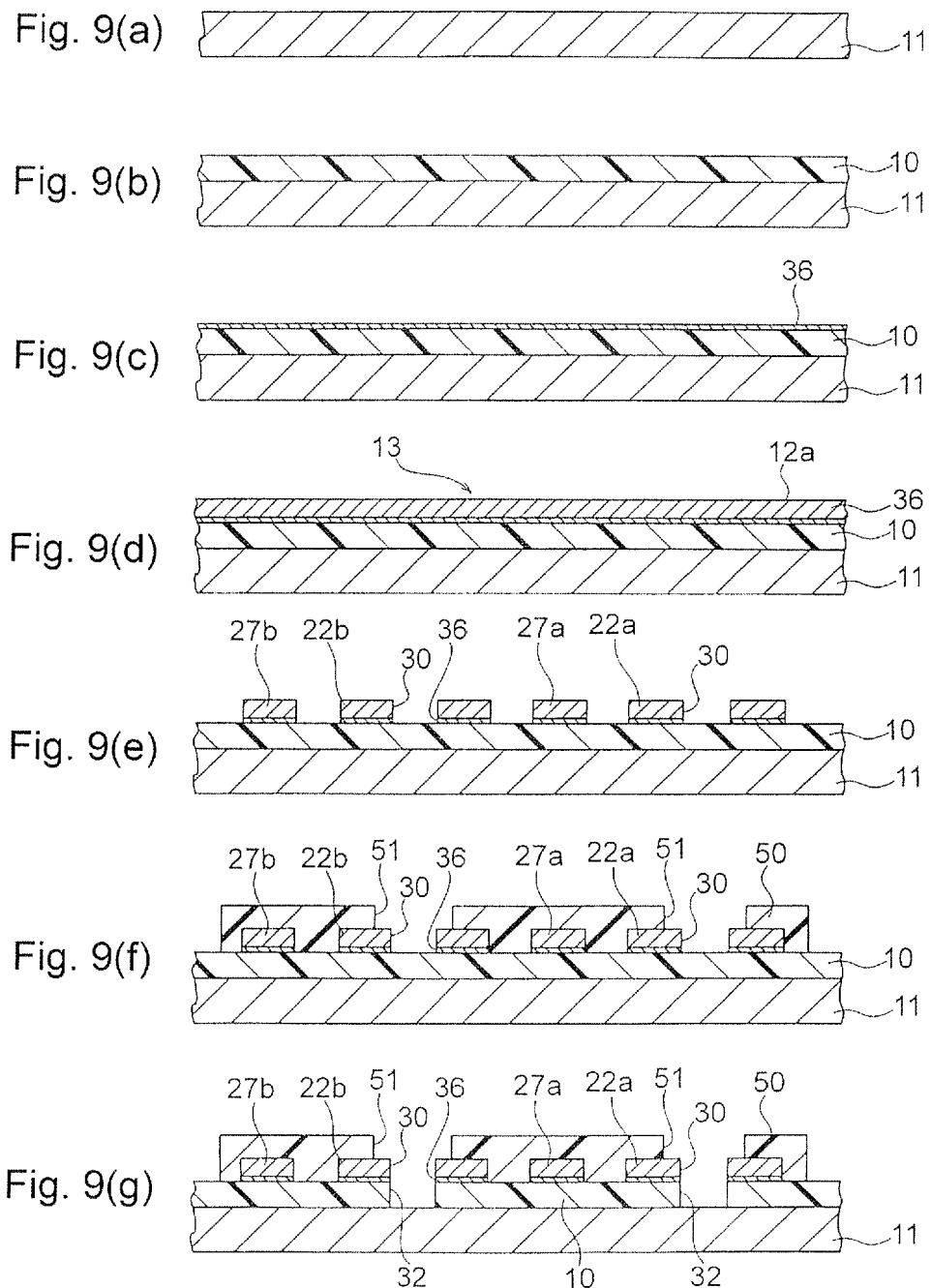
FIGS. 9(a) to 9(g) are diagrams respectively provided for illustrating one method for manufacturing the suspension substrate related to the first embodiment of the present invention.

As shown in FIGS. 9 and 10, a metallic thin film layer 36 formed of nickel (Ni), chromium (Cr) or any suitable alloy of such metals (this alloy may contain copper) may be provided between the insulating layer 10 and each wiring 12. With the provision of such a metallic thin film layer 36, the adhesion between the insulating layer 10 and each wiring 12 can be substantially enhanced. Further, as shown in FIG. 10, a plated layer 37 formed by nickel plating and gold (Au) plating may be provided between each conductive connection part 34 and each wiring 12.

Now, each component will be described in more detail.

As the material used for forming the insulating layer 10, any suitable material can be used, without limitation, provided that this material can exhibit desired insulating properties. Preferably, a polyimide (PI) material is used. It is noted that the material used for forming the insulating layer 10 may be a photosensitive material, or otherwise may be a non-photosensitive material. Preferably, the thickness of the insulating layer 10 is within a range of from 5 µm to 30 µm, more preferably 5 µm to 15 µm. With this thickness of the insulating layer 10, desired insulating ability between the spring material layer 11 and each wiring 12 can be ensured. Further, this thickness of the insulating layer 10 can effectively prevent the rigidity of the entire suspension substrate 1 from being unduly lowered.

Each wiring 12 is provided as a conductive body or element adapted for transmitting the electric signal. As the material used for forming each wiring 12, any suitable material can be used, without limitation, provided that this material can exhibit desired conductivity. For instance, a copper (Cu) material is suitable. However, any other material than the copper material can be used, provided that this material can exhibit the electric properties equivalent to those of pure copper. Preferably, the thickness of each wiring 12 is within a range of from 1 µm to 18 µm, more preferably 5 µm to 12 µm. This thickness can ensure adequate transmission characteristics of each wiring 12, as well as can prevent the flexibility of the entire suspension substrate 1 from being unduly lowered.

As the material used for forming each conductive connection part 34, any suitable material can be used, without limitation, provided that this material can exhibit adequate conductivity. Preferably, nickel or copper is used for forming each conductive connection part 34. More preferably, nickel is used. With the provision of such conductive connection parts 34, unwanted deformation of the top face of each conductive connection part 34 can be positively prevented, even in the case in which a distal end of a continuity tester (e.g., a probe) is pressed against the top face of the conductive connection part 34.

As the material used for forming the spring material layer 11, any suitable material can be used, without limitation, provided that this material can exhibit desired conductivity, elasticity and strength. For instance, stainless steel, aluminum, beryllium copper and other suitable copper alloys can be used. Preferably, stainless steel is used. In this case, it is preferred that the thickness of the spring material layer 11 is greater than the thickness of each wiring 12. For instance, the thickness of the spring material layer 11 is within a range of from 10 µm to 30 µm, more preferably 15 µm to 25 µm.

As the material used for the protective layer 50, a proper resin material, e.g., polyimide, can be used. It is noted that the material of this protective layer 50 may be either of the photosensitive material or non-photosensitive material. Preferably, the thickness of the protective layer 50 is within a range of from 2 µm to 30 µm.

Figure 6:
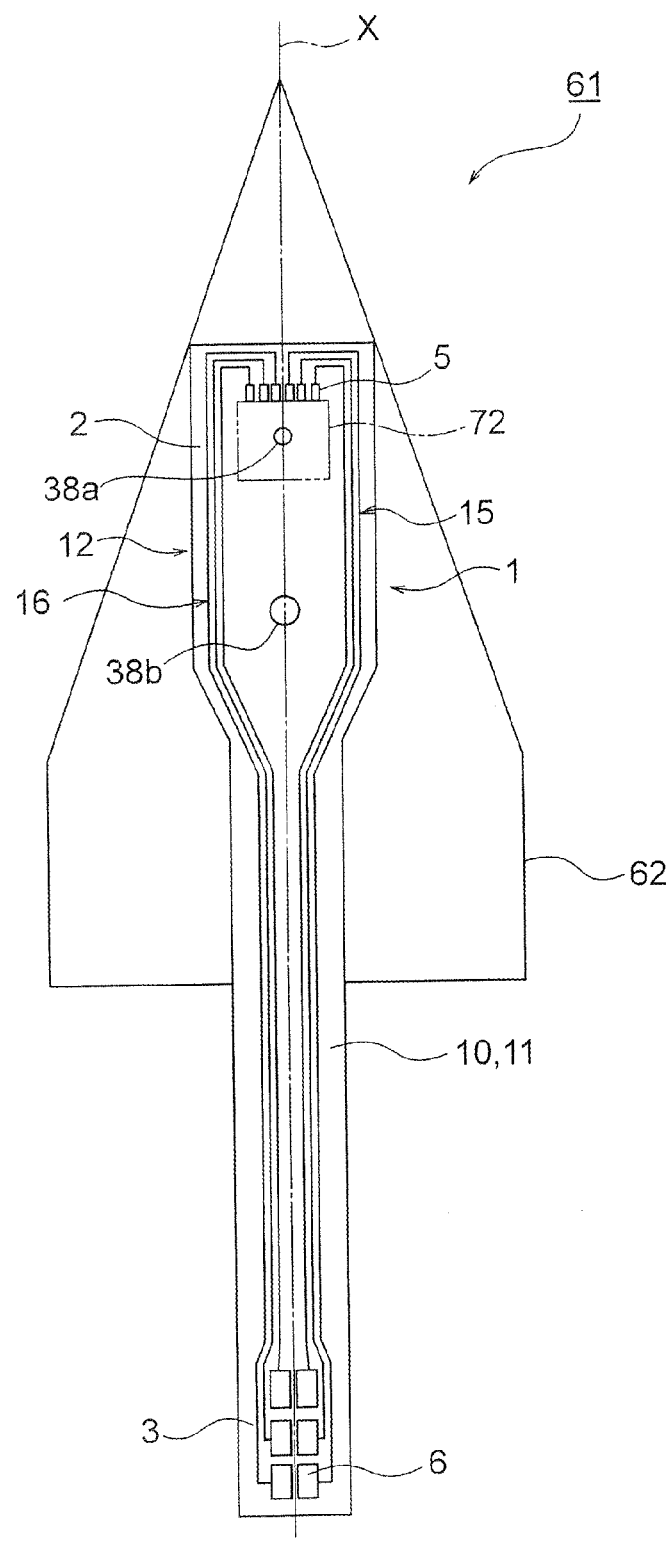
FIG. 6 is a plan view showing one example of the suspension related to the first embodiment of the present invention.

Now, referring to FIG. 6, the suspension 61 related to this embodiment will be described. As shown in FIG. 6, the suspension 61 includes the suspension substrate 1 and the load beam 62. The load beam 62 is provided on one face of the suspension substrate 1, opposite to the face thereof on which the slider 72 that will be described later (see FIG. 7) is mounted. This load beam 62 can serve to hold the slider 72 relative to the disk 83 (see FIG. 8).

Figure 7:
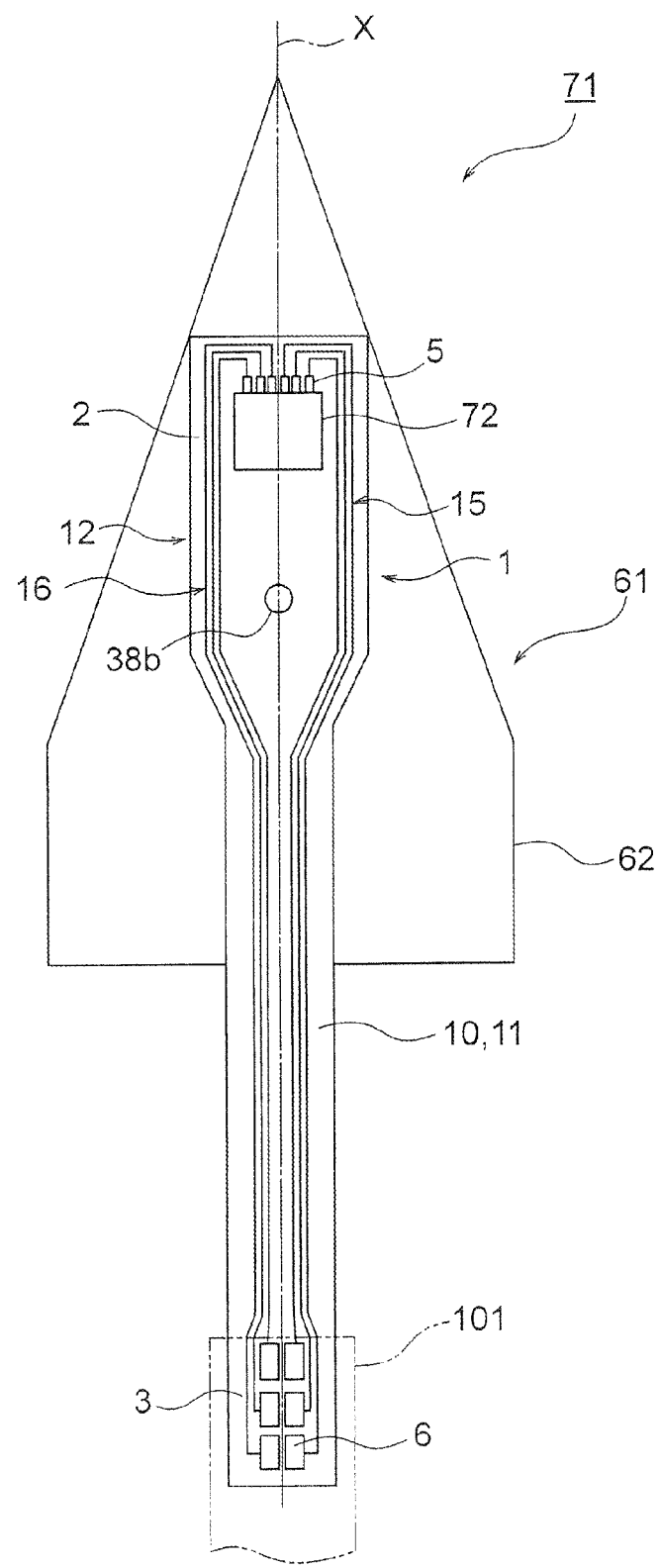
FIG. 7 is a plan view showing one example of the head suspension related to the first embodiment of the present invention.

Next, referring to FIG. 7, the head suspension 71 related to this embodiment will be described. As shown in FIG. 7, the head suspension 71 includes the aforementioned suspension 61 and slider 72 mounted on the head portion 2 of the suspension substrate 1.

Figure 8:
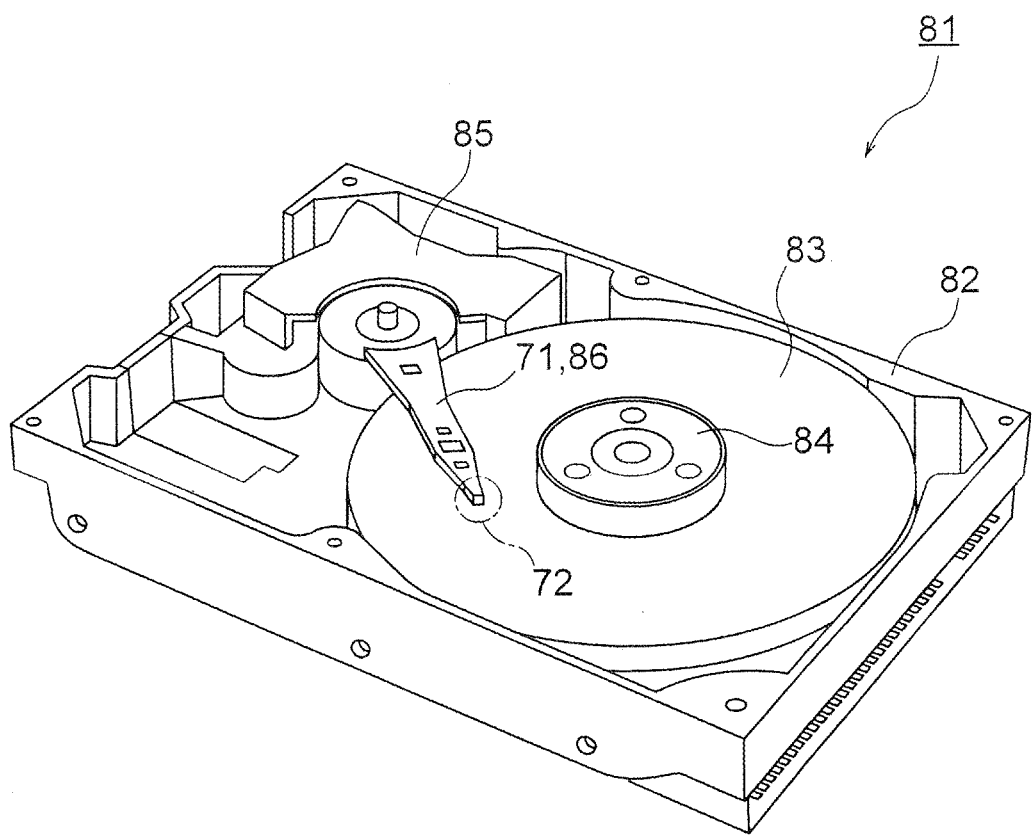
FIG. 8 is a perspective view showing one example of the hard disk drive related to the first embodiment of the present invention.

Further, referring to FIG. 8, the hard disk drive 81 related to this embodiment will be described. As shown in FIG. 8, the hard disk drive 81 includes a case 82, the disk 83 rotatably attached to the case 82 and adapted for storing therein the data, a spindle motor 84 adapted for rotating the disk 83, and the head suspension 71 including the slider 72 adapted for writing and reading the data relative to the disk 83. In this case, the slider 72 is provided to be moved near the disk 83, while keeping a desired flying height relative to the disk 83. Specifically, the head suspension 71 is movably attached to the case 82, such that the voice coil motor 85 attached to the case 82 can move the slider 72 of the head suspension 71 over and along the disk 83. Further, in this case, the head suspension 71 is attached to the voice coil motor 85, via an arm 86.

Next, the operation related to the embodiment constructed as described above, i.e., one exemplary method for manufacturing the suspension substrate 1 related to the above embodiment, will be discussed. In this case, as described above, the connection structure between the second tail-side wiring part and each second division wiring part 27a, 27b is similar to the head-side bifurcated portion, in which the first head-side wiring part 21 is connected with each first division wiring part 22a, 22b, and thus the explanation about such connection structure will be omitted.

First of all, the layered body or material 13 including the insulating layer 10, the spring material layer 11 provided on one face of the insulating layer 10 and having the conductivity, and the wiring material layer 12a provided on the other face of the insulating layer 10, is prepared.

In this case, the spring material layer 11 is first prepared (see FIG. 9(a)), and then the insulating layer 10 formed of the non-photosensitive material is provided on the spring material layer 11 (see FIG. 9(b)). Subsequently, the metallic thin film layer 36 is formed on the insulating layer 10 (see FIG. 9(c)), and then the wiring material layer 12a is formed on the metallic thin film layer 36 (see FIG. 9(d)). In this case, the wiring material layer 12a may be formed by electrolytic copper plating. In this way, the layered body or material 13 including the insulating layer 10, spring material layer 11 and wiring material layer 12a can be obtained. Alternatively, the wring material layer 12a may be provided on the insulating layer 10, without the metallic thin film layer 36 provided on the insulating layer 10. However, with the provision of the metallic thin film layer 36, the adhesion between the insulating layer 10 and the wiring material layer 12a can be substantially enhanced. In place of providing the metallic thin film layer 36 on the insulating layer 10, a proper adhesive layer (not shown) may be formed on the insulating layer 10 and then the wiring material layer 12a may be provided on the adhesive layer.

Then, the plurality of wirings 12 (including the pair of writing wirings 15 and pair of reading wirings 16) are respectively formed from the wiring material layer 12a of the layered body 13 (see FIG. 9(e)). In this case, a pattern-like resist (not shown) is first formed on the wiring material layer 12a by a photo-fabrication method. Subsequently, the metallic thin film layer 36 and wiring material layer 12a are respectively etched, via each opening formed in the resist, with a corrosive liquid, such as an aqueous ferric chloride solution or the like. In this way, the pair of reading wirings 16, writing wirings 20, 25 respectively including the aforementioned head-side wiring parts 21, 26 and division wiring parts 22a, 22b, 27a, 27b can be formed, as well as the wiring through-hole 30 can be formed in each of the division wiring parts 22a, 22b, 27a, 27b. After this etching process is ended, the resist is removed.

Thereafter, the protective layer 50 for covering each wiring 12 is provided on the insulating layer 10 (see FIG. 9(f)). In this case, the protective layer 50 formed of the non-photosensitive material is provided on the insulating layer 10, and then another proper pattern-like resist is formed on the protective layer 50. Then, the protective layer 50 is etched, via each opening formed in the pattern-like resist, with an etching liquid, such as an organic alkaline liquid or the like. In this way, each opening 51 is formed in the protective layer 50. Otherwise, plasma etching may be used for etching the protective layer 50. Once this etching process is ended, the resist is removed.

Thereafter, each insulating through-hole 32 is formed in a position corresponding to each wiring through-hole 30 in the insulating layer 10 (see FIG. 9(g)). In this case, another proper pattern-like resist is first formed, and then the insulating layer 10 is etched, via each opening formed in the resist, with a suitable etching liquid, such as the organic alkaline liquid or the like. Thus, each insulating through-hole 32 can be formed in the insulating layer 10. After this etching process is ended, the resist is removed. It is noted that this etching process for the insulating layer 10 may be performed by the plasma etching.

Then, the conductive connection part 34 is provided to each of the wiring through-holes 30 and insulating through-holes 32. In this case, the plated layer 37 is first provided to each exposed portion of the division wiring parts 22a, 22b, 27a, 27b in each wiring through-hole 30 (see FIG. 10(a)). More specifically, the plated layer 37 is formed by the nickel plating and gold plating successively provided to each corresponding division wiring part. This plated layer 37 can be formed by using the writing wiring 20, 25 as a plating power supply layer Preferably, the plating process for forming the plated layer 37 is performed at the same time as the plating process provided to the head terminals 5 and external-equipment connection terminals 6. In this way, the plated layer 37 can be formed more efficiently. Thereafter, the nickel plating is provided to each of the insulating through-holes 32 and wiring through-holes 30, in order to form each conductive connection part 34 formed of nickel (see FIG. 10(b)). As a result, each conductive connection part 34 is connected with each of the division wiring parts 22a, 22b, 27a, 27b, via the plated layer 37. In this case, the top face of each conductive connection part 34 is exposed to the outside from each corresponding opening 51 of the protective layer 50. With this configuration, a disconnection test for each of the division wiring parts 22a, 22b, 27a, 27b can be performed via the top face of each exposed conductive connection part 34.

Thereafter, the spring material layer 11 is separated into the spring-material-layer main body 40 (see FIG. 2 or other related drawings), first spring-material-layer separated body 41 and second spring-material-layer separated body 42 (see FIG. 10(c)). In this case, another suitable pattern-like resist is first formed on the spring material layer 11. Then, the spring material layer 11 is etched, via each opening of the resist, with a proper corrosive liquid, such as the aqueous ferric chloride solution or the like. Thus, the spring material layer 11 is separated into the spring-material-layer main body 40 and each of the first spring-material-layer separated body 41 and second spring-material-layer separated body 42. After this etching process is ended, the resist is removed.

Then, the load beam 62 is attached to a bottom face of the suspension substrate 1 obtained as described above, thereby to obtain the suspension 62 shown in FIG. 6. In this case, the load beam 62 is aligned with the suspension substrate 1, by using the jig holes 38a, 38b and corresponding jig holes (not shown) respectively provided in the load beam 62. Thereafter, the slider 72 is mounted on the head portion 2 of the suspension 61, thereby to obtain the head suspension 71 shown in FIG. 7. In this case, a slider pad of the slider 72 is connected with each wiring 12. Further, the head suspension 71 is attached to the case 82 of the hard disk drive 81, thereby to obtain the hard disk drive 81 shown in FIG. 8.

When the data is written or read in the hard disk drive 81 shown in FIG. 8, the slider 72 of the head suspension 71 moves over and along the disk 83 by the voice coil motor 85, while keeping the desired flying height relative to the disk 83 rotated by the spindle motor 84. During this operation, the data is transferred between the slider 72 and the disk 83, with the electric signal being transmitted through each wiring 12 extending between the head portion 2 and the tail portion 3 of the suspension substrate 1.

As described above, according to this embodiment, the first writing wiring 20 of the plurality of wirings 12 can be bifurcated into such a desired wring structure that can effectively enhance the electric characteristics of the first writing wiring 20. In particular, the first division wiring parts 22a, 22b bifurcated from the first head-side wiring part 21 of the first writing wiring 20 and the second division wiring parts 27a, 27b bifurcated from the second wiring part 26 of the second writing wiring 25 are respectively arranged alternately to one another. With this arrangement of such division wiring parts, the capacitance between the first writing wiring 20 and the second writing wiring 25 can be substantially increased, as such substantially reducing the impedance of each writing wiring 20, 25, thus significantly enhancing the electric characteristics.

Further, according to this embodiment, the first spring-material-layer separated body 41 connected with each first division wiring part 22a, 22b of the first writing wiring 20 is located on one side relative to the longitudinal axis X passing through the center of the slider 72 mounted on the suspension substrate 1, while the second spring-material-layer separated body 42 is located on the other side relative to the longitudinal axis X. With this configuration, the spring material layer 11 having substantially greater area and mass than the wirings 12 can be arranged such that it is prevented from decentering to one side relative to the longitudinal axis X. Therefore, the shape of the entire body of the spring material layer 11 can also be well balanced about the longitudinal axis X, thus stabilizing the floating properties of the slider 72. In particular, according to this embodiment, the first spring-material-layer separated body 41 and second spring-material-layer separated body 42 are respectively located to have the line symmetry about the longitudinal axis X. Therefore, the shape of the entire body of the spring material layer 11 can also have the line symmetry, as such being well balanced, about the longitudinal axis X. Further, this configuration can successfully control the flexibility of the suspension substrate 1 to have the line symmetry about the longitudinal axis X. Thus, the balance of air resistance and balance of mass in the suspension substrate 1 can be substantially enhanced, thereby adequately stabilizing the floating properties of the slider 72.

Further, according to this embodiment, each of the first and second spring-material-layer separated bodies 41, 42 is located on the distal end side relative to each outrigger part 40b of the spring-material-layer main body 40, and is thus not surrounded by the spring-material-layer main body 40. By the way, if the rigidity of a distal end of the head portion 2 is relatively low, the floating slider 72 tend to become unstable due to an effect of the air bearing (or air resistance). However, with the first spring-material-layer separated body 41 and second spring-material-layer separated body 42 provided as described in this embodiment, adequate rigidity can be provided to the distal end of the head portion 2. Therefore, it is possible to prevent the suspension substrate 1 from being unduly deformed or warped due to the effect of air bearing, during the rotation of the disk 83. Thus, the floating properties of the slider 72 can be substantially stabilized.

Further, according to this embodiment, each of the first and second spring-material-layer separated bodies 41, 42 is located on the distal end side relative to the slider 72 mounted on the substrate suspension 1, and each head-side bifurcated portion of the first writing wiring 20 and second writing wiring 25 is positioned near the slider 72. As such, the region, in which the first division wiring parts 22a, 22b and second division wiring parts 27a, 27b are respectively arranged alternately to one another, can be provided to be substantially long, thus substantially reducing the impedance of the pair of writing wirings 15.

Further, according to this embodiment, each first division wiring part 22a, 22b is connected with the first spring-material-layer separated body 41 separated from the spring-material-layer main body 40, via each corresponding conductive connection part 34 extending through the insulating layer 10. This configuration can successfully avoid an unwanted multi-layered structure of the wirings 12, and enable the first division wiring parts 22a, 22b and second division wiring parts 27a, 27b to be respectively arranged alternately to one another. As such, the impedance can be substantially reduced, thereby enhancing the electric characteristics. In addition, this configuration can enable the suspension substrate 1 to be readily manufactured, as well as can achieve significantly reduced production cost.

Further, according to this embodiment, the first writing wiring 20 is bifurcated at the head-side bifurcated portion thereof, via the first spring-material-layer separated body 41, while the second writing wiring 25 is bifurcated on the side of the tail portion 3, in the same connection structure as the head-side bifurcated portion of the first writing wiring 20. With this configuration, each route of the first writing wiring 20 and second writing wiring 25 can be provided, in a similar manner, with substantially the same impedance.

Further, according to this embodiment, the thickness of the spring material layer 11 is greater than the thickness of each wiring 12. With this configuration, each of the first spring-material-layer separated body 41 and second spring-material-layer separated body 42 can have a thickness greater than the thickness of each wiring 12, at the distal end of the head portion 2. Thus, proper rigidity can be provided to the distal end of the head portion 2. Therefore, the effect of air bearing can be well controlled during the rotation of the disk 83, and hence the floating properties of the slider 72 can be effectively stabilized.

Further, according to this embodiment, by utilizing the so-called subtractive method, each wiring 12 is formed by etching the wiring material layer 12a in the layered body 13 including the spring material layer 11, insulating layer 10 and wiring material layer 12a. By utilizing this subtractive method, the adhesion between each wiring 12 and the insulating layer 10 can be enhanced, as well as the thickness of each wiring 12 can be controlled to be adequately uniform. In addition, each conductive connection part 34 is formed by the nickel plating provided to each insulating through-hole 32 and each wiring through-hole 30, before the spring layer material 11 is separated into the spring-material-layer main body 40, first spring-material-layer separated body 41 and second spring-material-layer separated body 42. As such, when the nickel plating is performed, the entire body of the spring material layer 11 can be used as the plating power supply layer. Therefore, the working efficiency of this nickel plating can be significantly enhanced.

In this embodiment, one example, in which the first spring-material-layer separated body 41 and second spring-material-layer separated body 42 are respectively located to have line symmetry, relative to each other, about the longitudinal axis X, has been described. However, the arrangement of the two separated bodies 41 and 42 is not limited to this example. For instance, the first spring-material-layer separated body 41 may be located on one side relative to the longitudinal axis X, with the second spring-material-layer separated body 42 being located on the other side relative to the longitudinal axis X. Also in this case, the shape of the spring material layer 11 can be adequately balanced on either side of the longitudinal axis X, thus well stabilizing the floating properties of the slider 72.

Further, in this embodiment, one example, in which each conductive connection part 34 is formed by the nickel plating provided to each insulating through-hole 32 and each wiring through-hole 30, after the plated layer 37 formed of the nickel plating and gold plating is provided to each exposed part of the writing wirings 20, 25 in the corresponding wiring through hole 30, has been described. However, not limited thereto, for instance, each conductive connection part 34 may be formed by the nickel plating provided to each insulating through-hole 32 and each wiring through-hole 30, by utilizing the spring material layer 11 as the plating power supply layer, without providing the plated layer 37 to each exposed part of the writing wirings 20, 25 (see FIG. 11(a)). Also in this case, it is preferred that the spring material layer 11 is separated into the spring-material-layer main body 40, first spring-material-layer separated body 41 and second spring-material-layer separated body 42, as shown in FIG. 11(b), after the respective conductive connection parts 34 are formed.

Further, in this embodiment, one example, in which the first writing wiring 20 includes the first two division wiring parts 22a, 22b, and in which the second writing wiring 25 includes the second two division wiring parts 27a, 27b, has been described. However, not limited thereto, for instance, each writing wiring 20, 25 may be bifurcated into three or more division wiring parts, wherein the so-formed first division wiring parts and second division wiring parts are respectively arranged alternately to one another. In this case, the capacitance between the first writing wiring 20 and the second writing wiring 25 can be further increased, thereby further reducing the impedance of each writing wiring 20, 25. Additionally, each head-side wiring part 21, 26 can be connected with each corresponding division wiring part, in any suitable manners. For instance, the first head-side wiring part 21 may be connected with the three or more division wiring parts, via a single first spring-material-layer separated body 41. Alternatively, the first head-side wiring part 21 may be connected with each division wiring part, via two or more first spring-material-layer separated bodies 41. In this case, for example, two division wiring parts may be connected with the first head-side wiring part 21, via one spring-material-layer separated body, and one of such two division wiring parts may be further connected with a third division wiring part, via another spring-material-layer separated body. In the case of providing such two or more first spring-material-layer separated bodies 41, it is preferred that two or more second spring-material-layer separated bodies 42 are also provided in the same manner, and that the so-provided first spring-material-layer separated bodies 41 and second spring-material-layer separated bodies 42 are respectively arranged to have the line symmetry, relative to one another, about the longitudinal axis X.

Further, in this embodiment, one example, in which by utilizing the so-called subtractive method each wiring 12 is formed by etching the wiring material layer 12a in the layered body 13 including the spring material layer 11, insulating layer 10 and wiring material layer 12a, has been described. However, not limited thereto, for instance, the suspension substrate 1 may be formed, by employing the so-called additive method.

In the additive method, for example, the spring material layer 11 is first prepared, as shown in FIG. 12(a).

Thereafter, the insulating layer 10 having the insulating through-holes 32 formed therein is provided on the spring material layer 11 (see FIG. 12(b)). In this case, the insulating layer 10 formed of the non-photosensitive material is first provided on the spring material layer 11, and then another suitable pattern-like resist is formed on the insulating layer 10. Subsequently, the insulating layer 10 is etched, via each opening of the resist, with a proper etching liquid, such as the organic alkaline liquid or the like. In this way, the insulating through-holes 32 are formed in the insulating layer 10. Thereafter, the resist is removed.

Then, the metallic thin film layer 36 is formed on the insulating layer 10 (see FIG. 12(c)). In this case, the metallic layer 36 is also formed in each insulating through-hole 32.

Subsequently, the plurality of wirings 12 (including the pair of writing wirings 15 and pair of reading wirings 16) are respectively formed on the insulating layer 10, and the conductive connection part 34 is formed in each insulating through-hole 32 (see FIG. 12(d)). In this case, another proper pattern-like resist is first formed on the insulating layer 10, and then each wiring 12 is formed, by the electrolytic copper plating, via each opening of the resist. With this copper plating process, the conductive connection part 34 is formed integrally with the writing wiring 20 or 25 in each insulating through-hole 32. Thereafter, the resist is removed.

Then, each exposed portion of the metallic thin film layer 36 is removed by etching (see FIG. 12(e)).

Thereafter, the protective layer 50 for covering each wiring 12 is formed on the insulating layer 10 (see FIG. 12(f)). In this case, each conductive connection part 34 is also covered with the protective layer 50.

Subsequently, the spring material layer 11 is separated into the spring-material-layer main body 40 (see FIG. 2 and other related drawings), first spring-material-layer separated body 41 and second spring-material-layer separated body 42 (see FIG. 12(g)). In this case, another suitable pattern-like resist is formed on the spring material layer 11, and then this spring material layer 11 is etched with a suitable corrosive liquid, such as the aqueous ferric chloride solution or the like. In this way, the spring-material-layer main body 40 and each spring-material-layer separated body 41, 42 are formed, respectively. Thereafter, the resist is removed.

According to the example or aspect shown in FIG. 12, by employing the additive method, the insulating layer 10 in a desired pattern can be formed on the spring material layer 11, and then each wiring 12 can be formed on the insulating layer 10. In addition, each conductive connection part 34 can be formed together with each wiring 12, thus simplifying the manufacturing process. Moreover, each conductive connection part 34 is covered with the protective layer 50, and is thus not exposed to the outside in the layered structure finally obtained. This configuration can effectively prevent each copper-based conductive connection part 34 from being corroded.

Further, in the aspect shown in FIG. 12, the insulating layer 10 formed of the non-photosensitive material is provided, in a desired pattern, by etching, with the pattern-like resist formed thereon. However, not limited thereto, for instance, the insulating layer 10 may be formed of the photosensitive material. In this case, any desired pattern of such an insulating layer 10 can be obtained, by suitably exposing and developing this layer 10, without any pattern-like resist formed thereon. Similarly, in each of the examples respectively shown in FIGS. 9 and 12, the protective layer 50 may be formed by using the photosensitive material.

Figure 13:
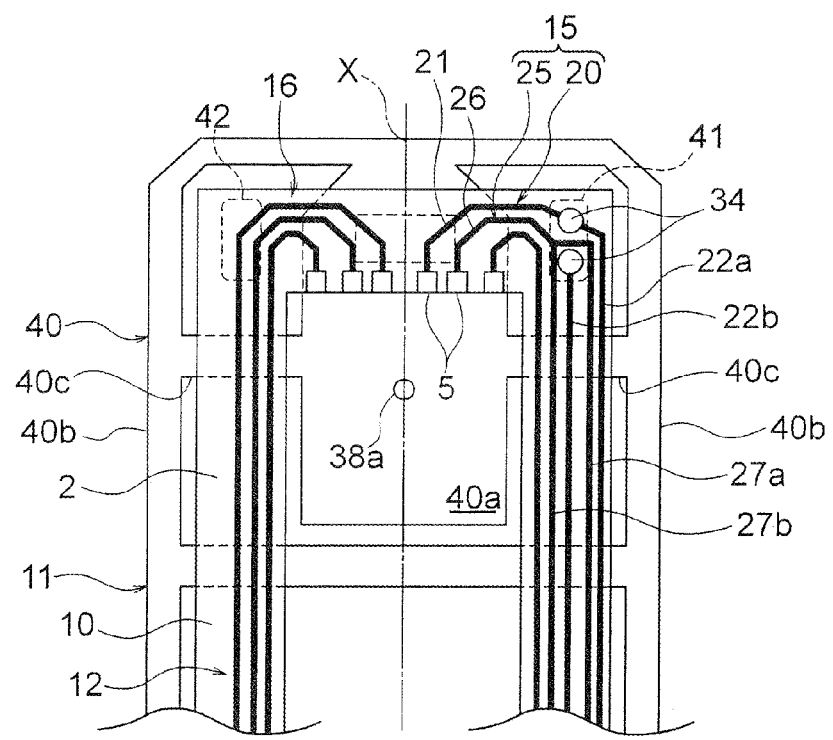
FIG. 13 is an enlarged plan view showing a first variation of the head portion of the suspension substrate related to the first embodiment of the present invention.

Further, in this embodiment, as shown in FIGS. 2 and 3, one example, in which the distal-end portion of the first spring-material-layer separated body 41 located on the opposite side (i.e., on the right side in FIG. 2) relative to the longitudinal axis X and the distal-end portion of the second spring-material-layer separated body 42 located on the opposite side (i.e., on the left side in FIG. 2) relative to the longitudinal axis X are not respectively surrounded by the spring-material-layer main body 40, has been described. However, not limited thereto, for instance, each of the first spring-material-layer separated body 41 and second spring-material-layer separated body 42 may be surrounded by each corresponding outrigger part 40b. Namely, as shown in FIG. 13, each outrigger part 40b of the spring-material-layer main body 40 may be connected with a distal end of the tongue part 40a, such that each outrigger part 40b can surround each corresponding one of the first spring-material-layer separated body 41 and second spring-material-layer separated body 42. In this case, substantially greater rigidity can be provided to the distal end of the head portion 2, thereby preventing, more positively, the suspension substrate 1 from being unduly deformed or warped due to the effect of air bearing, during the rotation of the disk 83. As such, the floating properties of the slider 72 can be further stabilized.

Figure 14:
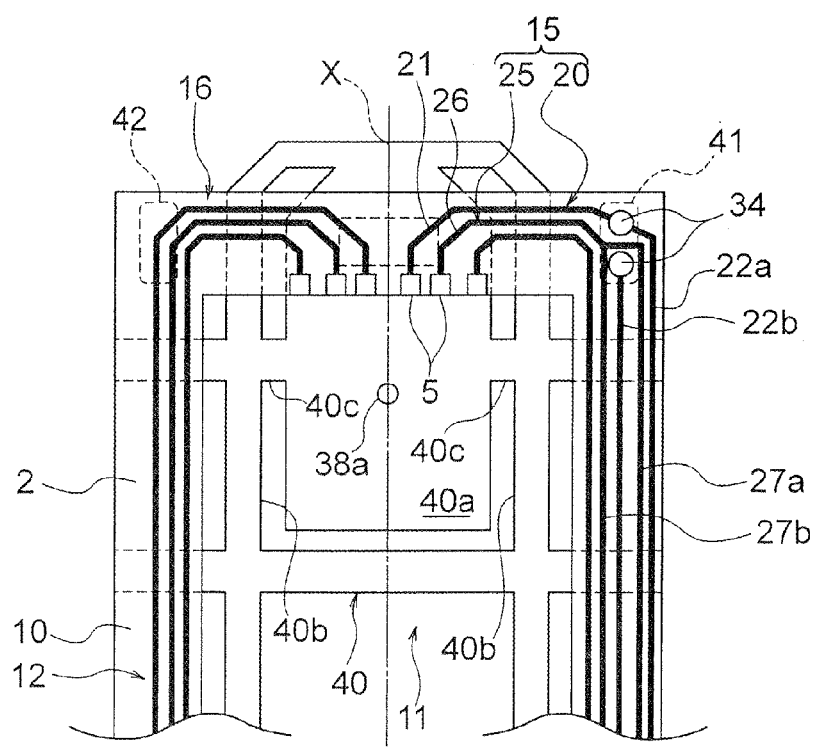
FIG. 14 is an enlarged plan view showing a second variation of the head portion of the suspension substrate related to the first embodiment of the present invention.

Further, in this embodiment, one example, in which each wiring 12 is arranged between the tongue part 40 and each outrigger part 40b (i.e., in the so-called inner-trace arrangement manner), has been described. However, not limited thereto, for instance, each wiring 12 and the first spring-material-layer separated body 41 and second spring-material-layer separated body 42 may be respectively located on the opposite side, across each corresponding outrigger part 40b, relative to the longitudinal axis X (i.e., in the so-called outer-trace arrangement manner). More specifically, as shown in FIG. 14, the pair of writing wirings 15 may be arranged on the opposite side (or right side in FIG. 14), across one outrigger part 40b (located on the right side in FIG. 14), relative to the longitudinal axis X, while the pair of reading wirings 16 may be arranged on the opposite side (or left side in FIG. 14), across the other outrigger part 40b (located on the left side in FIG. 14), relative to the longitudinal axis X. Also in this case, the distal-end portion of the first spring-material-layer separated body 41 located on the opposite side (or on the right side in FIG. 14) relative to the longitudinal axis X and the distal-end portion of the second spring-material-layer separated body 42 located on the opposite side (or on the left side in FIG. 14) relative to the longitudinal axis X are not respectively surrounded by each corresponding outrigger part 40b of the spring-material-layer main body 40. Generally, in the outer-trace arrangement, each wiring 12 is arranged on the opposite side (or outside), across the corresponding outrigger part 40b, relative to the longitudinal axis X. Therefore, the rigidity of the distal end of the head portion 2 may tend to be deteriorated, leading to unstable floatation of the slider 72 due to the effect of air bearing. However, in the example as shown in FIG. 14, the arrangement of the first spring-material-layer separated body 41 and second spring-material-layer separated body 42, respectively located on the opposite side (or outside), across each corresponding outrigger part 40b, relative to the longitudinal axis X, can provide greater rigidity to the distal end of the head portion 2. Thus, the warpage of the suspension substrate 1 due to the effect of air bearing during the rotation of the disk 83 can be well controlled, as well as the floating properties of the slider 72 can be positively stabilized. Additionally, in the example shown in FIG. 14, the distance between each wiring 12 and the slider 72 that will be mounted on the suspension substrate 1 can be substantially increased, thereby to substantially reduce a negative effect on the slider 72 due to the heat generated from each wiring 12.

Figure 15:
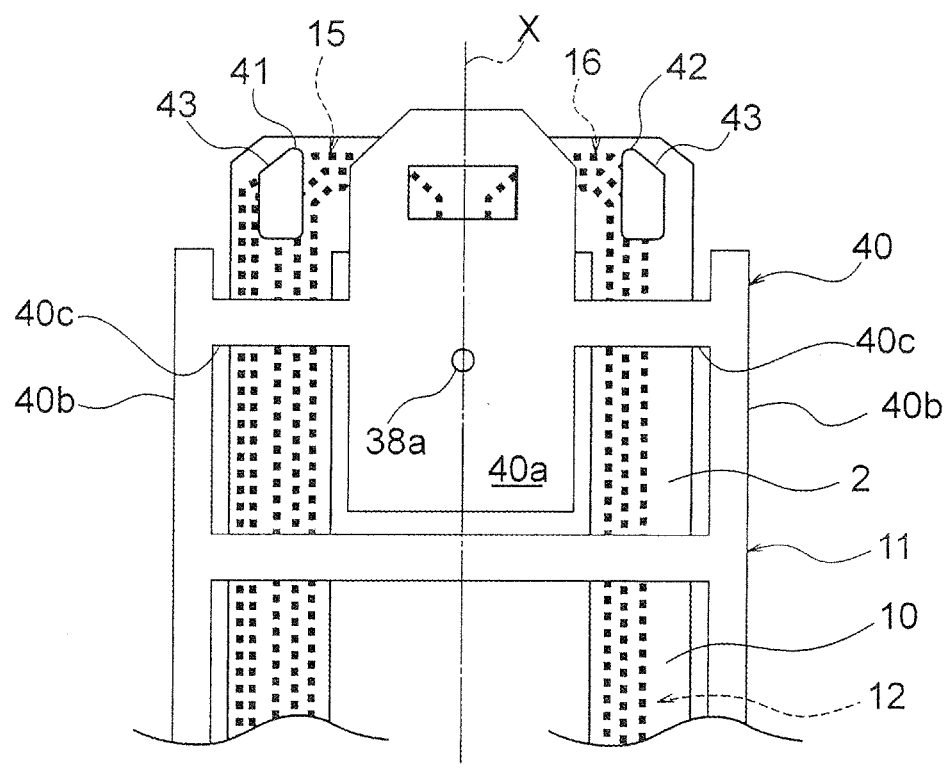
FIG. 15 is an enlarged plan view showing a third variation of the head portion of the suspension substrate related to the first embodiment of the present invention.

Further, in this embodiment, each of the first spring-material-layer separated body 41 and second spring-material-layer separated body 42 may be suitably chamfered, at an opposite and distal-end-side corner portion thereof relative to the longitudinal axis X, as shown in FIG. 15. More specifically, a linear chamfered portion 43 may be provided to an upper left corner portion (as shown in FIG. 15) of the first spring-material-layer separated body 41, and another linear chamfered portion 43 may be provided to an upper right corner portion (as shown in FIG. 15) of the second spring-material-layer separated body 42. In this case, as shown in FIG. 15, it is preferred that each corner portion of the insulating layer 10 corresponding to each chamfered portion 43 is also chambered in the same manner (or linearly). This configuration can further reduce the effect of air bearing, thus effectively stabilizing the floating properties of the slider 72.

Second Embodiment

Now, referring to FIG. 16, the suspension substrate related to the second embodiment of the present invention will be described.

Figure 16:
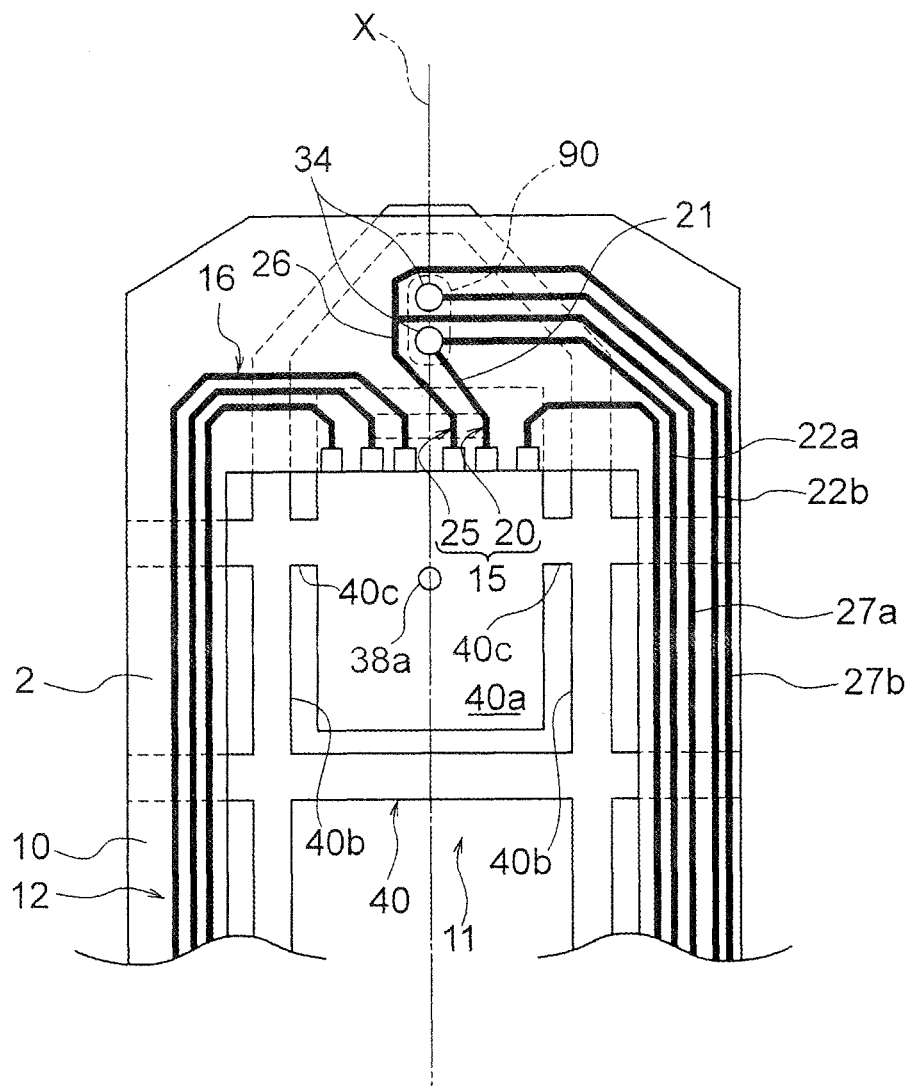
FIG. 16 is an enlarged plan view showing the head portion of the suspension substrate related to a second embodiment of the present invention.

As shown in FIG. 16, the second embodiment features that each spring-material-layer separated body is located on the longitudinal axis X. However, the other construction of this second embodiment is substantially the same as the first embodiment shown in FIGS. 1 through 10. It is noted that like parts in the first embodiment shown in FIGS. 1 through 10 are respectively designated by like reference numerals in FIG. 16, and further explanation on such parts will be omitted below.

Namely, in the second embodiment shown in FIG. 16, the spring material layer 11 includes the spring-material-layer main body 40 and a rectangular spring-material-layer separated body 90 separated from the spring-material-layer main body 40. The spring-material-layer separated body 90 is located on the longitudinal axis X. More specifically, the central axis of the spring-material-layer separated body 90 (or the line passing through the pair of conductive connection parts 34) is positioned on the longitudinal axis X.

In this case, one first division wiring part 22a of the first writing wiring 20 is connected with the spring-material-layer separated body 90, via one conductive connection part 34, while the other first division wiring part 22b is connected with the spring-material-layer separated body 90, via the other conductive connection part 34. Namely, with this configuration, the spring-material-layer separated body 90 can serve to electrically connect the first division wiring part 22a with the second division wiring part 22b.

Further, in this case, the spring-material-layer separated body 90 is located on the distal end side of the suspension substrate 1, relative to the slider 72 that will be mounted on the suspension substrate 1. Namely, each head-side bifurcated portion of the first writing wiring 20 and second writing wiring 25 is located on the distal end side of the suspension substrate 1 relative to the slider 72, while being adjacent to the slider 72.

In the second embodiment shown in FIG. 16, as is similar to the example shown in FIG. 14, each wiring 12 is arranged on the opposite side (or outside), across each corresponding outrigger part 40b, relative to the longitudinal axis X (i.e., in the outer-trace arrangement manner). However, as shown in FIG. 16, the spring-material-layer separated body 90 may be surrounded by the corresponding outrigger part 40b, on the distal end side of the slider 72. In this case, the substantially greater rigidity can be provided to the head portion 2, thereby positively controlling the warpage of the suspension substrate 1 caused by the effect of air bearing during the rotation of the disk 83. As such, the floating properties of the slider 72 can be further stabilized.

As stated above, according to this embodiment, the first writing wiring 20, among the plurality of wirings 12, can be bifurcated, thereby to enhance the electric characteristics of this first writing wiring 20. Further, the first division wiring parts 22a, 22b bifurcated from the first head-side wiring part 21 of the first writing wiring 20 and the second division wiring parts 27a, 27b bifurcated from the second head-side wiring part 26 of the second writing wiring 25 are respectively arranged alternately to one another. With this configuration, the capacitance between the first writing wiring 20 and the second writing wiring 25 can be substantially increased, as such reducing the impedance of each writing wiring 20, 25, thus successfully enhancing the electric characteristics.

Further, according to this embodiment, the spring-material-layer separated body 90 connected with each first division wiring part 22a, 22b of the first writing wiring 20 is located on the longitudinal axis X passing through the center of the slider 72 that will be mounted on the slider 72. This configuration can enable the shape of the spring material layer 11 to have the line symmetry about the longitudinal axis X, thus making this spring material layer 11 be well balanced relative to the longitudinal axis X. Therefore, the flexibility of the suspension substrate 1 can also be controlled to have adequate line symmetry about the longitudinal axis X. As such, the balance of air bearing or air resistance and balance of mass in the suspension substrate 1 can be significantly enhanced, thereby to well stabilize the floating properties of the slider 72.

Third Embodiment

Next, referring to FIG. 17, the suspension substrate related to the third embodiment will be described.

Figure 17:
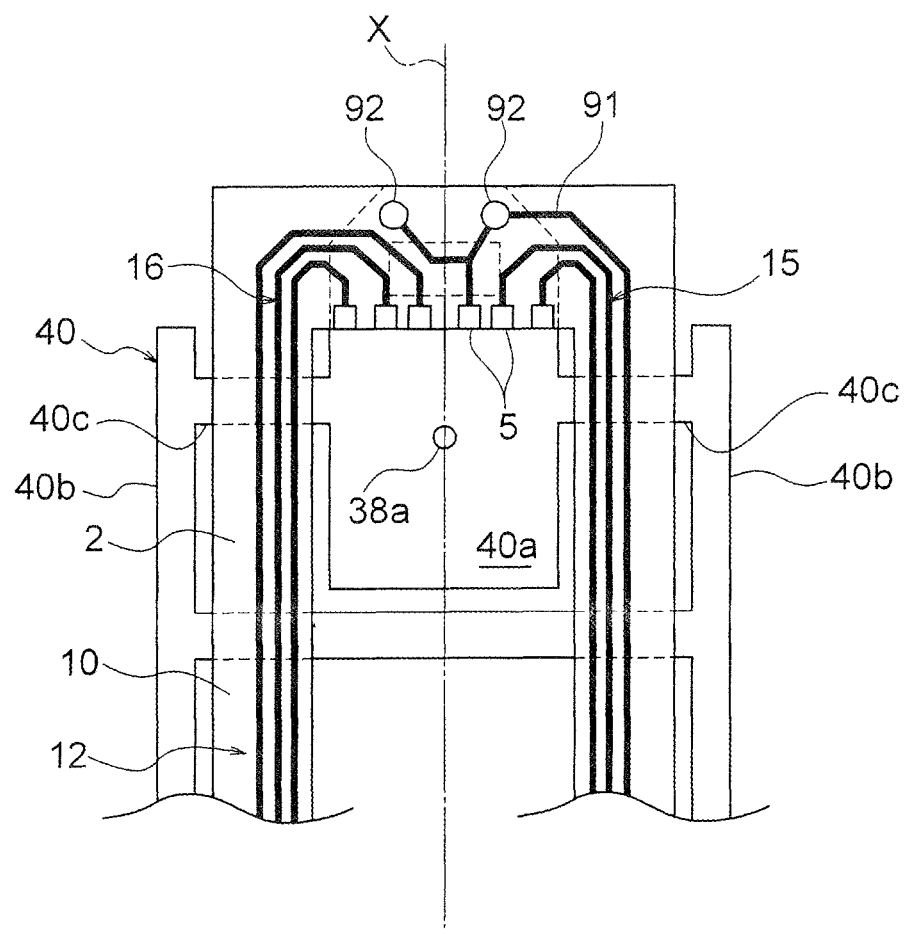
FIG. 17 is an enlarged plan view showing the head portion of the suspension substrate related to a third embodiment of the present invention.

In the third embodiment as shown in FIG. 17, the grounding wiring is connected with the spring material layer, via the pair of grounding connection parts which are located to have the line symmetry about the longitudinal axis. However, the other construction of this third embodiment is substantially the same as the first embodiment shown in FIGS. 1 through 10. It is noted that like parts in the first embodiment shown in FIGS. 1 through 10 are respectively designated by like reference numerals in FIG. 17, and thus will not be further explained below.

Namely, as shown in FIG. 17, one wiring 12 of the plurality of wirings 12 is provided as the grounding wiring 91 for grounding the slider 72 that will be mounted on the suspension substrate 1. Further, the pair of grounding connection parts 92 (or conductive connection parts 34) are respectively provided to extend through the insulating layer 10. In this case, the grounding wiring 91 is connected with the spring-material-layer main body 40 (or distal end of the tongue part 40a) of the spring material layer 11, via each grounding connection part 92. It is noted that this embodiment does not include any spring-material-layer separated body separated from the spring-material-layer main body 40.

In this embodiment, one grounding connection part 92 is located on one side relative to the longitudinal axis X, while the other grounding connection part 92 is located on the other side to have the line symmetry, relative to the one grounding connection part 92, about the longitudinal axis X.

Namely, according to this embodiment, the grounding wiring 91 for grounding the slider 72 is connected with the spring material layer 11, via the pair of grounding connection parts 92 which are respectively located to have the line symmetry, relative to each other, about the longitudinal axis X. With this configuration, the flexibility of the suspension substrate 1 can be well controlled to have the line symmetry about the longitudinal axis X. As such, the balance of air bearing and balance of mass in the suspension substrate 1 can be significantly enhanced, thereby well stabilizing the floating properties of the slider 72.

In this embodiment, one example, in which the pair of grounding connection parts 92 are arranged to have the line symmetry, relative to each other, about the longitudinal axis X, has been described. However, not limited thereto, for instance, one grounding connection part 92 may be located on one side relative to the longitudinal axis X, with the other grounding connection part 92 being located on the other side relative to the longitudinal axis X. Also in this case, the balance of air bearing and balance of mass in the suspension substrate 1 on either side of the longitudinal axis X can be adequately enhanced, thereby to well stabilize the floating properties of the slider 72.

While several preferred embodiments of the present invention have been described and shown in detail, each of the suspension substrate, suspension, head suspension, hard disk drive and method for manufacturing the suspension substrate, respectively related to this invention, is not limited, in any way, to such embodiments. Namely, various modifications and variations can be made to such embodiments, without departing from the scope and gist of this invention.

For instance, in the above first and second embodiments, the pair of grounding connection parts 92 may be provided, as similar to the third embodiment shown in FIG. 17, in any suitable positions respectively different from the positions of the respective conductive connection parts 34. In this case, the grounding wiring 91 for grounding the slider 72 may be connected with the spring-material-layer main body 40, via each grounding connection part 92. Also in this case, the flexibility of the suspension substrate 1 can be well controlled to have proper line symmetry about the longitudinal axis X, thus well stabilizing the floating properties of the slider 72.

The invention claimed is:

1. A suspension substrate extending from a head portion on which a slider is mounted, to a tail portion with which an external connection substrate is connected, the suspension substrate having a linear longitudinal axis passing through the center of the slider to be mounted on the head portion, the suspension substrate comprising:
    an insulating layer;
    a spring material layer provided on one face of the insulating layer, the spring material layer having conductivity; and
    a plurality of wirings, respectively provided on the other face of the insulating layer,
    wherein one wiring of the plurality of wirings includes a head-side wiring part extending from the head portion and a plurality of division wiring parts, respectively bifurcated from the head-side wiring part,
    wherein the spring material layer includes a spring-material-layer main body and a spring-material-layer separated body separated from the spring-material-layer main body,
    wherein a pair of conductive connection parts are provided to extend through the insulating layer,
    wherein one division wiring part of said one wiring is connected with the spring-material-layer separated body, via one of the conductive connection parts, while the other division wiring parts are respectively connected with the spring-material-layer separated body, via the other conductive connection part, and
    wherein the spring-material-layer separated body is located on the longitudinal axis.

2. The suspension substrate according to claim 1, wherein the spring-material-layer separated body is located on the distal end side relative to the slider to be mounted on the head portion.

3. The suspension substrate according to claim 1, wherein the spring-material-layer separated body is surrounded by the spring-material-layer main body.

4. The suspension substrate according to claim 1, wherein the thickness of the spring material layer is greater than the thickness of each wiring.

5. The suspension substrate according to claim 1,
    wherein said one wiring and second wiring constitute together a pair of writing wirings,
    wherein the second wiring includes a second head-side wiring part extending from the head portion and a plurality of second division wiring parts respectively bifurcated from the second head side wiring part, and
    wherein the division wiring parts of said one wiring and the second division wiring parts of the second wiring are respectively arranged alternately to one another.

6. The suspension substrate according to claim 1,
    wherein one wiring of the plurality of wirings is provided as a grounding wiring for grounding the slider to be mounted on the head portion,
    wherein a pair of grounding connection parts are provided to extend through the insulating layer,
    wherein the grounding wiring is connected with the spring-material-layer main body, via each grounding connection part, and
    wherein one grounding connection part is located on one side relative to the longitudinal axis, and the other grounding connection part is located on the other side relative to the longitudinal axis, while having line symmetry, relative to the one grounding connection part, about the longitudinal axis.

7. A suspension substrate extending from a head portion on which a slider is mounted, to a tail portion with which an external connection substrate is connected, the suspension substrate having a linear longitudinal axis passing through the center of the slider to be mounted on the head portion, the suspension substrate comprising:

an insulating layer;

a spring material layer provided on one face of the insulating layer, the spring material layer having conductivity; and a plurality of wirings, respectively provided on the other face of the insulating layer, wherein one wiring of the plurality of wirings is provided as a grounding wiring for grounding the slider to be mounted on the head portion, wherein a pair of grounding connection parts are provided to extend through the insulating layer, wherein the grounding wiring is connected with the spring material layer, via each grounding connection part, and wherein one grounding connection part is located on one side relative to the longitudinal axis, and the other grounding connection part is located on the other side relative to the longitudinal axis.

8. The suspension substrate according to claim 7, wherein the pair of grounding connection parts are respectively arranged to have line symmetry, relative to each other, about the longitudinal axis.

9. A method for manufacturing a suspension substrate extending from a head portion on which a slider is mounted, to a tail portion with which an external connection substrate is connected, the suspension substrate having a linear longitudinal axis passing through the center of the slider to be mounted on the head portion, the method comprising:

preparing a layered body including an insulating layer, a spring material layer provided on one face of the insulating layer, the spring material layer having conductivity, and a wiring material layer provided on the other face of the insulating layer;

forming a plurality of wirings from the wiring material layer, such that one wiring of the plurality of wirings includes a head-side wiring part extending from the head portion and a plurality of division wiring parts, respectively bifurcated from the head-side wiring part, as well as forming a pair of wiring through-holes for each division wiring part;

forming a pair of insulating through-holes in the insulating layer, in positions respectively corresponding to the pair of wiring through-holes;

forming a conductive connection part in each wiring through-hole and each insulating through-hole; and forming a spring-material-layer main body and a spring-material-layer separated body separated from the spring-material-layer main body, from the spring material layer, wherein one division wiring part of said one wiring is connected with the spring-material-layer separated body, via one conductive connection part, while the other division wiring parts are respectively connected with the spring-material-layer separated body, via the other conductive connection part, and wherein the spring-material-layer separated body is located on the longitudinal axis.

10. A method for manufacturing a suspension substrate extending from a head portion on which a slider is mounted, to a tail portion with which an external connection substrate is connected, the suspension substrate having a linear longitudinal axis passing through the center of the slider to be mounted on the head portion, the method comprising:

preparing a spring material layer;

forming an insulating layer having a pair of insulating through-holes, in the spring material layer;

forming a plurality of wirings on the insulating layer, such that one wiring of the plurality of wirings includes a head-side wiring part extending from the head portion and a plurality of division wiring parts, respectively bifurcated from the head-side wiring part, as well as forming a conductive connection part in each insulating through-hole; and forming a spring-material-layer main body and a spring-material-layer separated body separated from the spring-material-layer main body, from the spring material layer, wherein one division wiring part of said one wiring is connected with the spring-material-layer separated body, via one conductive connection part, while the other division wiring parts are respectively connected with the spring-material-layer separated body, via the other conductive connection part, and wherein the spring-material-layer separated body is located on the longitudinal axis.

\* \* \* \* \*